United States Patent
Berchtold et al.

(10) Patent No.: US 10,071,345 B2
(45) Date of Patent: Sep. 11, 2018

(54) POLYBENZIMIDAZOLE HOLLOW FIBER MEMBRANES AND METHOD FOR MAKING AN ASYMMETRIC HOLLOW FIBER MEMBRANE

(71) Applicant: Los Alamos National Security, LLC, Los Alamos, NM (US)

(72) Inventors: Kathryn A. Berchtold, Los Alamos, NM (US); Kevin W. Dudeck, Jemez Springs, NM (US); Rajinder P. Singh, Los Alamos, NM (US); Ganpat J. Dahe, Pittsburgh, PA (US)

(73) Assignee: Los Alamos National Security, LLC, Los Alamos, NM (US)

( * ) Notice: Subject to any disclaimer, the term of this patent is extended or adjusted under 35 U.S.C. 154(b) by 160 days.

(21) Appl. No.: 15/190,011

(22) Filed: Jun. 22, 2016

(65) Prior Publication Data
US 2016/0375410 A1    Dec. 29, 2016

Related U.S. Application Data

(60) Provisional application No. 62/183,598, filed on Jun. 23, 2015.

(51) Int. Cl.
| | |
|---|---|
| *B01D 69/08* | (2006.01) |
| *B01D 53/22* | (2006.01) |
| *B01D 71/62* | (2006.01) |
| *B01D 61/36* | (2006.01) |
| *B01D 63/02* | (2006.01) |

(Continued)

(52) U.S. Cl.
CPC ......... *B01D 69/087* (2013.01); *B01D 53/228* (2013.01); *B01D 61/36* (2013.01); *B01D 61/362* (2013.01); *B01D 63/022* (2013.01); *B01D 71/62* (2013.01); *B01D 2256/16* (2013.01); *B01D 2257/504* (2013.01); *B01D 2323/12* (2013.01); *B01D 2323/26* (2013.01); *B01D 2323/30* (2013.01); *B01D 2325/022* (2013.01); *B01D 2325/20* (2013.01); *C02F 1/448* (2013.01); *C02F 2101/30* (2013.01); *Y02C 10/10* (2013.01)

(58) Field of Classification Search
CPC ............ B01D 53/228; B01D 2053/224; B01D 61/36; B01D 61/362; B01D 69/08; B01D 69/087; B01D 71/62; B01D 71/64; B01D 2256/16; B01D 2257/504; B01D 2323/12; B01D 2323/26; B01D 2323/30; B01D 2325/022; B01D 2325/20; C02F 1/44; C02F 1/447; C02F 1/448; C02F 2101/30
See application file for complete search history.

(56) References Cited

U.S. PATENT DOCUMENTS

| | | |
|---|---|---|
| 2,895,948 A | 7/1959 | Brinker et al. |
| RE26,065 E | 7/1966 | Marvel |

(Continued)

OTHER PUBLICATIONS

Vogel and Marvel, "Polybenzimidazoles, new thermally stable polymers," *Journal of Polymer Science*, 50(154):511-539 (1961).

*Primary Examiner* — Jason M Greene
(74) *Attorney, Agent, or Firm* — Klarquist Sparkman, LLP

(57) ABSTRACT

This disclosure concerns methods for formation of a novel PBI asymmetric hollow fiber membrane and its application for gas separations, gas/vapor separations, gas/liquid separations (i.e., pervaporation), and liquid separations including solute molecule removal from organic solvents and water.

30 Claims, 15 Drawing Sheets

(51) Int. Cl.
*C02F 1/44* (2006.01)
*C02F 101/30* (2006.01)

(56) References Cited

U.S. PATENT DOCUMENTS

| | | | |
|---|---|---|---|
| 3,737,042 A | 6/1973 | Boom | |
| 3,851,025 A * | 11/1974 | Ram | B01D 69/08 264/184 |
| 4,506,068 A | 3/1985 | Choe et al. | |
| 4,512,894 A * | 4/1985 | Wang | B01D 71/62 210/500.28 |
| 4,814,530 A | 3/1989 | Ward et al. | |
| 5,871,680 A * | 2/1999 | MacHeras | B01D 69/087 210/500.3 |
| 6,946,015 B2 | 9/2005 | Jorgensen et al. | |
| 6,997,971 B1 * | 2/2006 | Young | B01D 53/228 95/45 |
| 2003/0159980 A1 * | 8/2003 | Barss | B01D 71/62 210/321.8 |
| 2004/0261616 A1 * | 12/2004 | Jorgensen | B01D 53/228 95/51 |
| 2007/0151926 A1 | 7/2007 | Calundann et al. | |
| 2011/0146492 A1 * | 6/2011 | Dopkins | B01D 69/087 96/10 |
| 2011/0192281 A1 * | 8/2011 | Hosseini | B01D 71/62 96/10 |
| 2011/0266222 A1 * | 11/2011 | Wang | B01D 69/08 210/650 |
| 2011/0311745 A1 * | 12/2011 | Yang | B01D 69/087 428/36.9 |
| 2014/0137735 A1 * | 5/2014 | Bhandari | B01D 69/087 95/47 |
| 2014/0175007 A1 * | 6/2014 | Jayaweera | B01D 69/087 210/500.23 |
| 2016/0296892 A1 * | 10/2016 | Kharul | B01D 69/087 |

\* cited by examiner

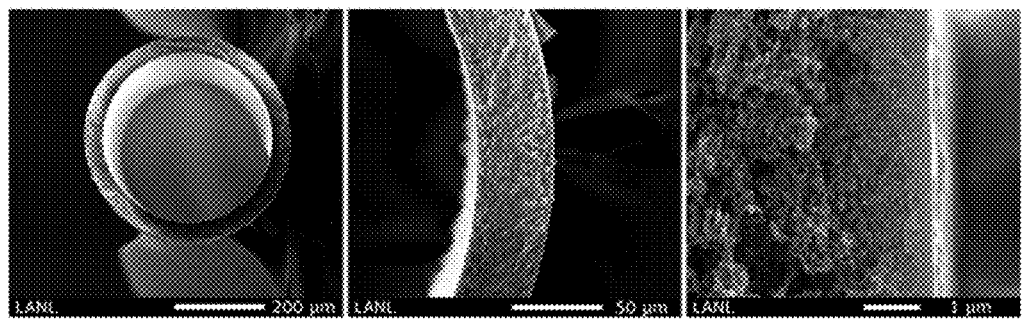
FIG. 3A    FIG. 3B    FIG. 3C
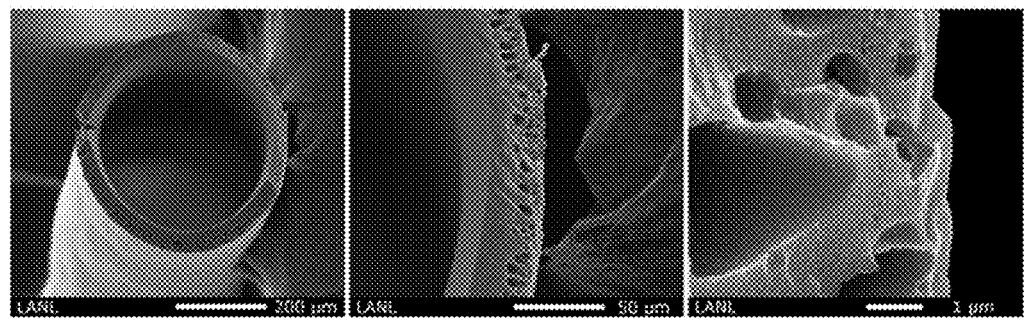
FIG. 3D    FIG. 3E    FIG. 3F
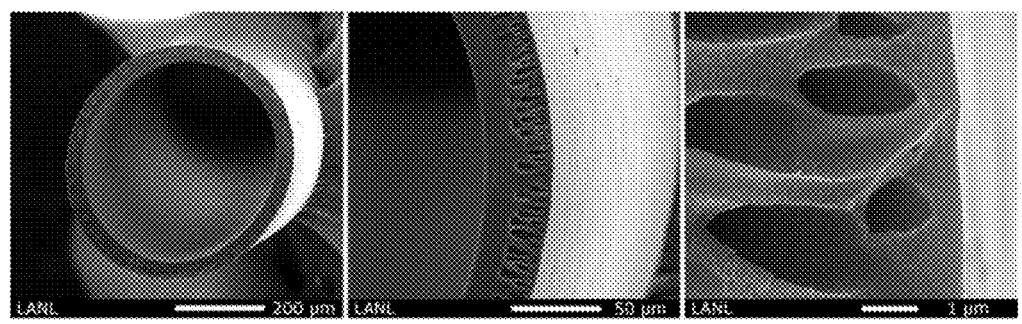
FIG. 3G    FIG. 3H    FIG. 3I
FIGS. 3A-3I

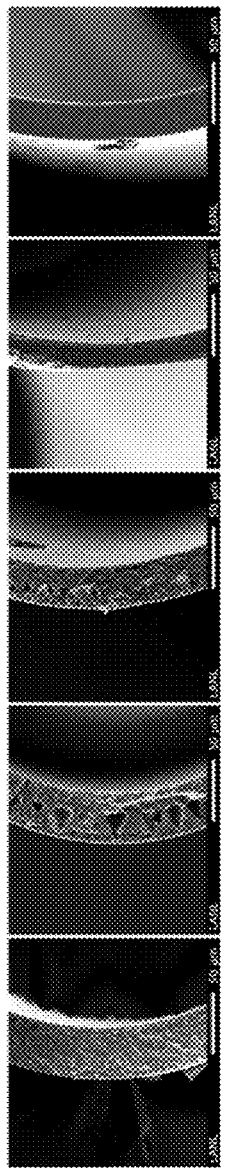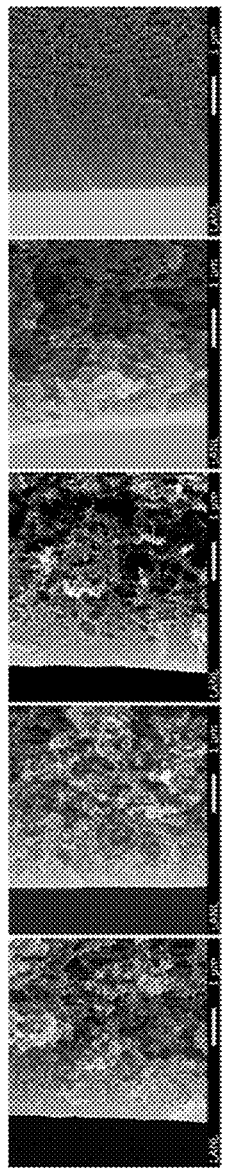
FIGS. 4A-4O

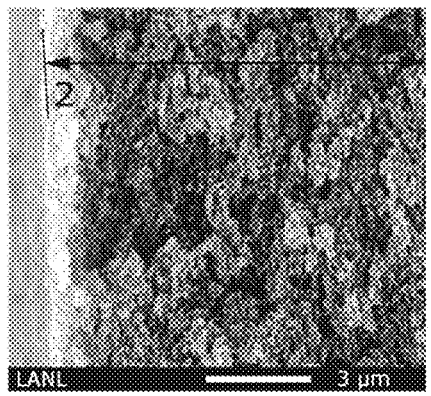
FIG. 5A
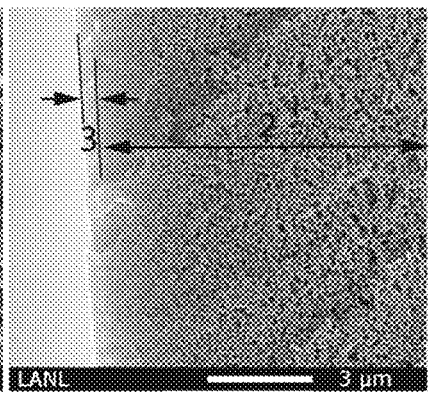
FIG. 5B
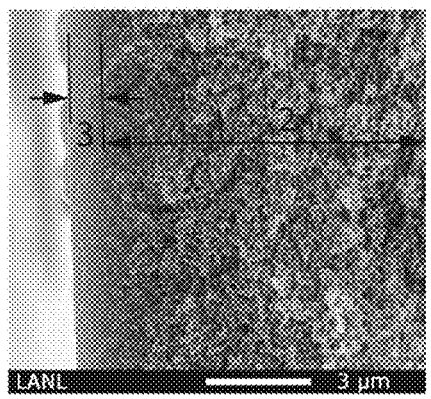
FIG. 5C
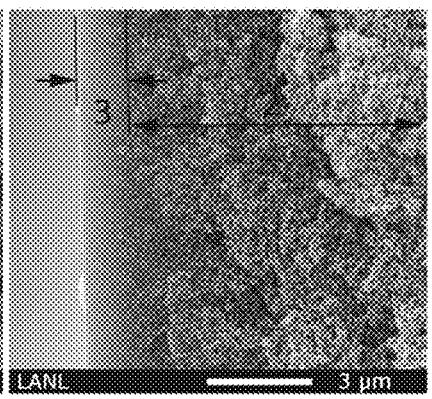
FIG. 5D
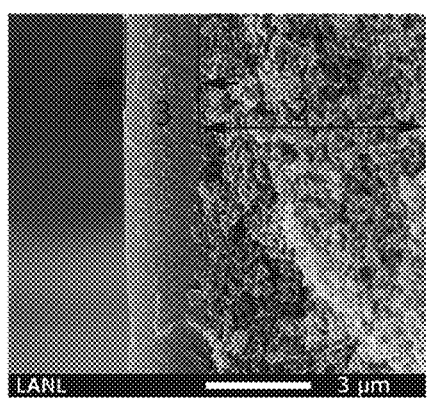
FIG. 5E
FIGS. 5A-5E

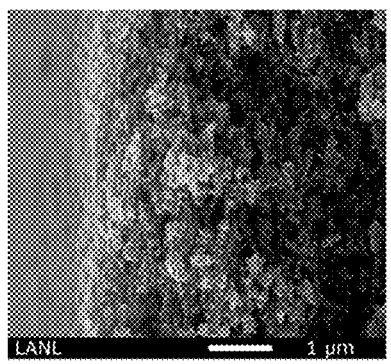
FIG. 8B
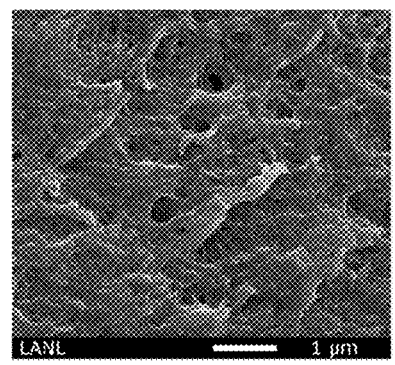
FIG. 8C
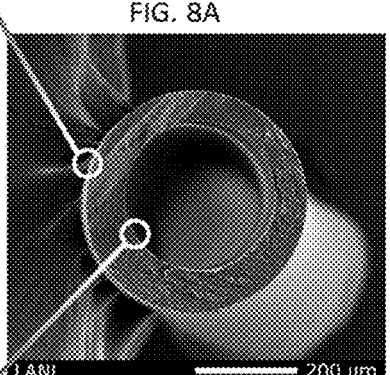
FIG. 8A
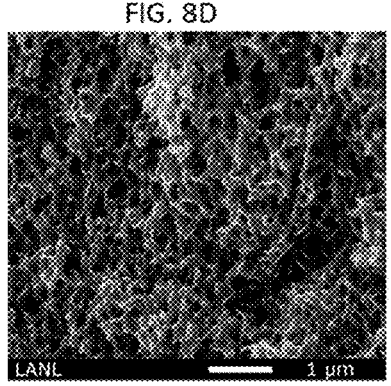
FIG. 8D
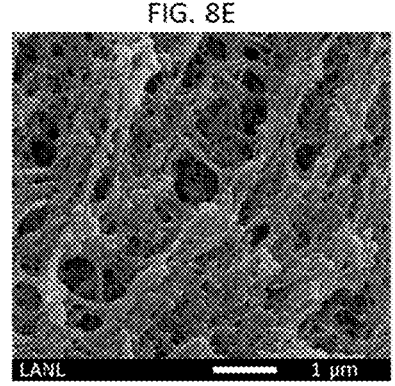
FIG. 8E
FIGS. 8A-8E

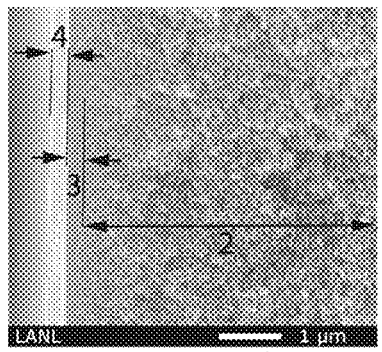
FIG. 10B
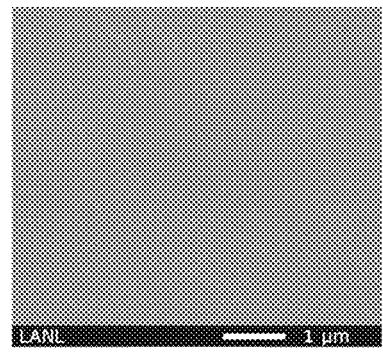
FIG. 10C
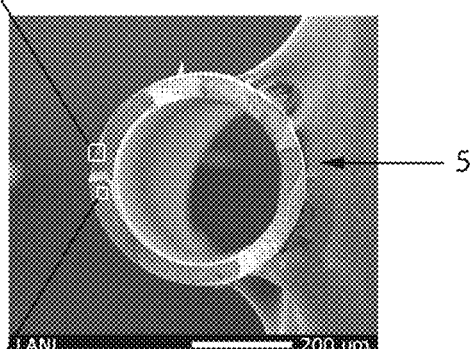
FIG. 10A
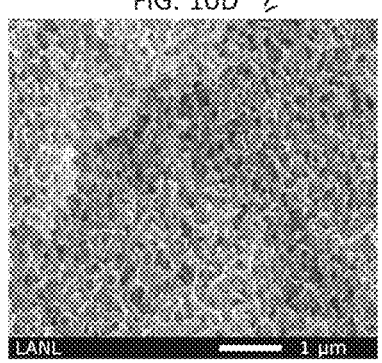
FIG. 10D
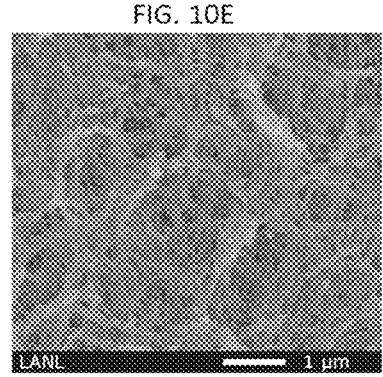
FIG. 10E
FIGS. 10A-10E

POLYBENZIMIDAZOLE HOLLOW FIBER MEMBRANES AND METHOD FOR MAKING AN ASYMMETRIC HOLLOW FIBER MEMBRANE

CROSS REFERENCE TO RELATED APPLICATION

This application claims the benefit of U.S. Provisional Application No. 62/183,598, filed Jun. 23, 2015, which is incorporated by reference in its entirety.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

This disclosure concerns embodiments of polybenzimidazole hollow fiber membranes, as well as methods of making and using the membranes.

BACKGROUND

Energy efficient and cost effective power, fuels and chemicals production process schemes for efficient and environmentally friendly utilization of hydrocarbon fuel resources such as coal, biomass, solid waste, and natural gas require advanced gas separation techniques. Many of these production processes involve the production and subsequent separation/purification of synthesis gas (syngas), where the syngas is generated via various means, largely depending on the target application and feedstocks utilized (e.g., steam methane reforming, partial oxidation, solid fuels gasification). After syngas cleanup, more hydrogen is produced by converting carbon monoxide in the syngas to carbon dioxide using steam via water gas shift (WGS) reaction. At this stage, syngas is predominantly composed of $H_2$, $CO_2$ and $H_2O$ (steam) with trace impurities such as CO, $H_2S$, $NH_3$, $N_2$, particulate matter, and metals. $H_2$ can then be separated from the syngas for use as fuel while the $CO_2$ rich retentate stream is compressed and subsequently sequestered or re-used. Techno-economic studies indicate that hydrogen separation and carbon dioxide capture at the syngas operating conditions (high temperature and high pressure) in the vicinity of WGS reactor results in higher efficiency and substantial cost savings. However, application of commercially available sorption- and membrane-based $H_2/CO_2$ separation techniques is limited to low temperatures (<100° C.) far below the syngas operating temperatures (>250° C.) process efficient integration.

A selected class of $H_2$ selective polymeric benzimidazole-based materials, known as polybenzimidazoles (PBI) has exceptional thermal and chemical stabilities for operation at realistic syngas operating conditions and chemical environments. To realize complete advantage of the PBI membranes comprised of these PBI materials at industrial scale, their translation into high surface area membrane (small footprint) deployment platforms such as hollow fiber with thin selective layers is required. Besides gas separation, porous PBI hollow fibers are also attractive for solute removal from liquids and organic solvents due to high chemical stability of PBI. PBI hollow fibers are hydrophilic due to the presence of amine group and expected to reduce fouling propensity especially in water purification application. However, the complex chemical and solution properties of PBI present a significant challenge to prepare mechanically robust high performance PBI hollow fiber using an environmentally benign fabrication process.

SUMMARY

This disclosure concerns methods for formation of a novel PBI asymmetric hollow fiber membrane and its application for gas separations, gas/vapor separations, gas/liquid separations (i.e., pervaporation), and liquid separations including solute molecule removal from organic solvents and water (e.g., purification of high salinity brines). The PBI hollow fiber membrane of the present disclosure utilizes a thermally stable and chemically resistant polymeric material, which is particularly suitable for separations relevant to the chemical, petrochemical and fossil fuel derived power production industries. The asymmetric hollow fibers comprising the PBI hollow fiber membrane are prepared via a phase inversion technique using a PBI dope solution and bore fluid, and outer coagulant fluid. This PBI spinning process results in an asymmetric PBI fiber having a porous support structure with an integrated thin selective layer. The thickness of the selective layer can be controlled to <500 nm without altering the underlying porous support structure. The hollow fibers may be thermally and/or chemically cross-linked by exposure to annealing/cross-linking temperatures >250° C. and/or cross-linking agents to improve their chemical resistivity and mechanical properties for subsequent processing and use. In some formulations, the solvent resistant hollow fibers formed by this method are coated with a defect-sealing layer to improve the selectivity. The polybenzimidazole materials are thermally stable (glass transition temperature, 450-500° C.), and have exceptional tolerance to sulfur, carbon and steam at elevated temperatures.

One aspect of the present disclosure is directed to a hollow fiber membrane for gas separation; comprising asymmetric hollow PBI fibers with an outer integrated thin selective dense layer and a porous underlying support structure. Another aspect of the present disclosure is directed to a method for the production of an asymmetric hollow fiber membrane comprising: preparing a dope solution comprising a PBI polymer, a dope stabilizing agent, and a mixture of two or more organic solvents/non-solvents, wherein one solvent is an aprotic solvent, such as N,N-dimethylacetamide (DMAc) or n-methyl-2-pyrrolidone (NMP), while a second solvent/non-solvent comprises a ketone, an organic nitrile, an alcohol, or a combination thereof, such as acetonitrile (ACN), acetone (ACE), and/or alcohols; dissolving the PBI and the dope stabilizing agent in the mixture of organic solvents/non-solvents to form a viscous dope mixture; and spinning the dope mixture to form an asymmetric hollow fiber membrane. In one embodiment, the polybenzimidazole used in various disclosed embodiments can be of various types, such as derivatives of aliphatic or aromatic heterocyclic polybenzimidazole of intrinsic viscosity (IV) ranging from 0.4 to 3.0 dL/g.

In one embodiment, a PBI hollow fiber prepared in an air gap forms an outer integrated selective dense layer and a porous underlying support structure, wherein a thickness of the dense selective layer varies with the length of the air gap. In another embodiment, water is used as coagulant to obtain macro-void free asymmetric polybenzimidazole fibers. Additionally, a defect-sealing layer may be deposited on outer selective layer of PBI hollow fiber, wherein the material of the defect-sealing layer is selected from chemically and thermally stable PBI derivatives of higher permeability than the PBI hollow fiber materials. This type membrane is suitable for gas separation, vapor permeation, dehydration of organic liquids and water/steam removal. The membrane is heat resistant and is operable, at temperatures up to 400° C., for example, from 20 to 400° C. In one example, the membrane is operable up to 350° C. In a particular embodiment, the membrane is capable of separating hot gases or vapors, where the temperature is 300, 350, or 400° C. In a particular embodiment, the membrane is capable of separating hot gases or vapors, where the temperature is from 250 to 350° C. In another embodiment, in addition to being heat resistant, the membrane is also resistant to chemical degradation, such that the membrane is resistant to changes in its structure and membrane function as a result of exposure with mercury, steam, hydrogen sulfide, carbonyl sulfide, carbon monoxide, fly-ash, SOx, NOx, acid gases.

One aspect of the present disclosure is directed to a method of selectively separating and recovering at least one kind of gas from a mixed gas or vapor, comprising feeding the mixed gas or vapor to a first, or feed, side of a gas separation membrane comprising an asymmetric hollow membrane made as according to the presently disclosed method, and selectively passing at least one kind of gas or vapor of the mixed gas or vapor through the gas separation membrane to the permeate side of the gas separation membrane.

In one embodiment, the membrane is used in hydrogen production, carbon capture, chemical manufacturing, power generation, refinery application, Fischer Tropsch liquids, fuel cell applications, and water/organic separations. In another embodiment, the membrane is used to separate a variety of gases or vapors, including hydrogen gas, steam, carbon dioxide, oxygen, nitrogen, methane, C1-C4 hydrocarbons, heavier hydrocarbons, carbon monoxide, hydrogen sulfide and hot mixed gases or vapors that contain organic compound. In another embodiment, the membrane is used for purification and/or concentration of high salinity brines such as those encountered in produced water streams from oil and gas operations, $CO_2$ sequestration, and geothermal power production operations.

The foregoing and other objects, features, and advantages of the invention will become more apparent from the following detailed description, which proceeds with reference to the accompanying figures.

BRIEF DESCRIPTION OF THE DRAWINGS

FIGS. 3A-3I are SEM images of PBI hollow fiber prepared from PBI dope using ACN, DMAc and NMP as solvent/non-solvent B, where FIGS. 3A-3C show a macrovoid-free hollow fiber with selective layer formation at the outer side using ACN as the solvent/non-solvent B; FIGS. 3D-3F show macrovoid-containing fibers prepared using DMAc as solvent/non-solvent B; and FIGS. 3G-3I show macrovoid-containing fibers prepared using NMP as solvent/non-solvent B.

FIGS. 4A-4O are SEM images of PBI hollow fiber prepared using 4A-4C: ACN/DMAc (85/15); 4D-4F: ACE/DMAc (85/15); 4G-4I: MeOH/DMAc (85/15); 4J-4L: EtOH/DMAc (85/15) and 4M-4O: IPA/DMAc (85/15) as a bore fluids, illustrating formation of outer integrated selective layer and porous underlying support structure except in 4J-4L. FIGS. 4B-4C, 44E-4F, 44H-4I, 4K-4L, and 4N-4O are images of the outer/inner layer of the PBI hollow fiber prepared using ACN/DMAc, ACE/DMAc, MeOH/DMAc, EtOH/DMAc and IPA/DMAc as bore fluids, respectively.

FIGS. 5A-5E are SEM images of the outer layer of PBI hollow fibers prepared at air gap, 5A: 0 cm; 5B: 0.5 cm; 5C: 1 cm, 5D: 2 cm and 5E: 3 cm, illustrating method to control the outer integrated dense selective layer thickness by varying air gap.

FIGS. 8A-8E are SEM images illustrating formation of an asymmetric PBI hollow fiber with porous selective layer, where FIGS. 8A, 8B, 8C, 8D and 8E are images of the whole fiber, outer layer, outer surface, center of fiber wall and inner surface, respectively.

FIGS. 10A-10E are SEM images of PBI hollow fibers illustrating a defect-sealing layer on the outer side of a PBI hollow fiber comprising outer integrated thin selective layer and porous underlying support structure, where FIGS. 10A, 10B, 10C, 10D and 10E are the images of whole fiber, outer layer, outer surface, center of fiber wall and inner surface, respectively.

DETAILED DESCRIPTION

Figure 1:
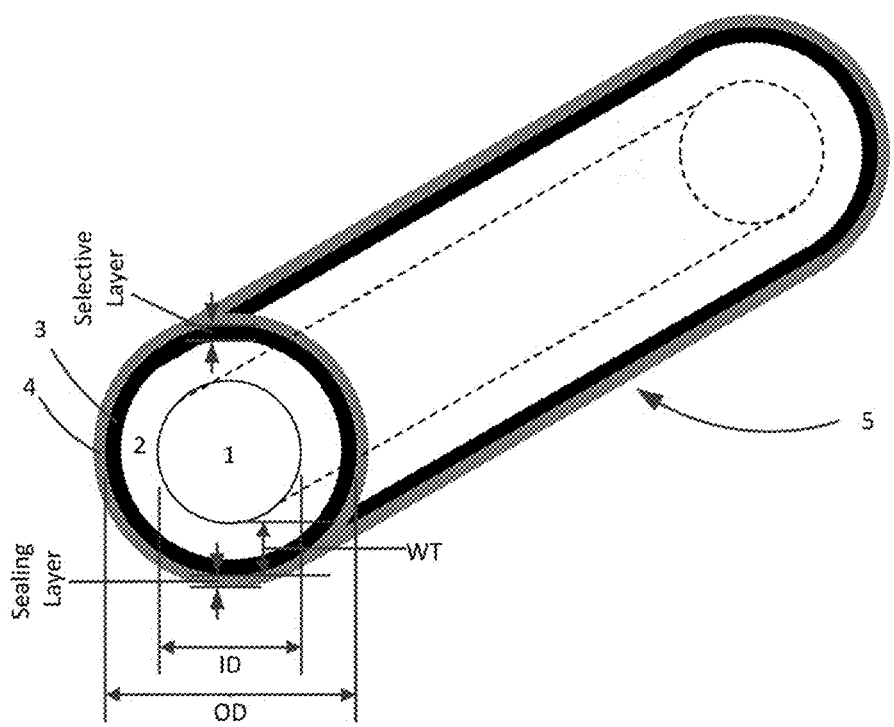
FIG. 1 is a schematic representation of a hollow fiber.

With no moving parts, energy conservation near thermodynamic limits, and various possible routes for integration into industrial process schemes, membrane-based separation technologies represent a technically and economically attractive route to address numerous industrially important gas, vapor, and liquid separations challenges. Membrane-based gas separation processes have rapidly evolved since the introduction of the first large industrial scale hydrogen selective Prism™ membranes (Air Products Inc.) in 1980s. Gas separation membranes are gaining a larger acceptance in industry and are competing with other separation techniques such as pressure swing absorption and cryogenic distillation. Membrane materials having required thermal, chemical and mechanical properties to withstand process operating conditions and chemical environments while having high permeability and selectivity are keys to successful commercial deployment.

In a syngas production process using solid hydrocarbon fuel (e.g. coal and biomass) gasification or steam reforming of natural gas, syngas is formed at high temperature and high pressure. After syngas cleanup, more hydrogen is produced by converting carbon monoxide to carbon dioxide using steam via the water gas shift reaction. At this stage, syngas is predominantly composed of $H_2$, $CO_2$ and $H_2O$ (steam) with trace impurities. $H_2$ can then be separated from syngas for use as fuel while $CO_2$ is compressed for sequestration or re-used to mitigate its emissions into the atmosphere.

$H_2$ is the cleanest fuel with water being the only product of combustion. It can be used to produce electricity via gas turbines or fuel cells at higher operating efficiency than hydrocarbon fuel and steam turbine based existing power plants. $H_2$ can also be used in fuels or chemical production (e.g. Fisher-Tropsch process). Therefore, $H_2$ production integrated with carbon capture is a highly desirable method for clean utilization of hydrocarbon fuel resources.

Economic studies indicate that $H_2$ separation and $CO_2$ capture from syngas in the vicinity of WGS reactors at syngas process conditions results in higher efficiency and substantial cost savings. However, application of commercially available gas separation techniques is limited to low temperatures (<100° C.) far below the necessary operating temperatures (>250° C.) for cost efficient $H_2/CO_2$ separations at syngas operating conditions.

Thermally and chemically robust membrane-based gas separation processes are attractive for $H_2/CO_2$ separations at syngas operating conditions. The high pressure of the process stream and corresponding high partial pressure of $H_2$ in that stream provide the driving force necessary for energy-efficient separation if the membrane-based separation system is integrated at realistic process conditions and provides $H_2$ adequate flux. However, the high temperature and presence of steam and trace impurities (e.g. carbon monoxide (CO) and hydrogen sulfide ($H_2S$)) in syngas present a very challenging operating environment for membrane separation system.

A selected class of $H_2$-selective polymeric membranes such as polybenzimidazoles (PBI) has exceptional thermal and chemical stabilities for operation at syngas elevated temperatures and chemical environments. These membranes allow $H_2$ to pass through while retaining $CO_2$ on the feed side. PBI-based membranes have commercially attractive $H_2/CO_2$ selectivity, exceptional thermal stability ($T_g$>400° C.), and exhibit tolerance to steam, $H_2S$, and CO. However, the $H_2$ permeability of the-state-of-the-art PBI-based materials mandates ultra-thin selective layers and high surface area membrane-deployment platforms such as hollow fibers. Successful transformation of PBI-based material in hollow fibers with a thin selective layer and porous underlying support structure is highly challenging because of the complex chemical structure and material properties.

Besides gas, vapor and liquid separations, membranes are widely used for removal of solute molecules from liquids such as water and organic solvents. Solute removal from organic solvents using membranes has enormous potential in the separation of active pharmaceutical agents, extraction of amino acids and lipids from blood and cell cultures, removal of tar components from petroleum feed, and chemical-related and flavors and fragrances industries. PBI has exceptional chemical stability and is a potential membrane material candidate for solute removal from organic solvents. The preferential water transport characteristics of PBI allow use of PBI membrane for water treatment processes such as high-salinity brine processing for efficient power production, brine concentration/disposal, and water conservation.

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing concentrations, quantities of components, percentages, temperatures, times, and so forth, as used in the specification or claims are to be understood as being modified by the term "about." Accordingly, unless otherwise implicitly or explicitly indicated, or unless the context if properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Air gap: A region of air between a distal end of a spinneret and the surface of a coagulation bath.

Asymmetric membrane: A membrane structure comprising two or more layers, including a thin dense or porous skin supported by a thick porous substructure in which one or more layers are formed from a single polymer dope by a phase inversion process. One or more layers can also be deposited using standard thin film deposition techniques after fiber formation with phase inversion process. Also referred to an integrally-skinned membrane.

Defect: As used herein, the term "defect" refers to a pore or opening in a material or matrix or layer which allows non-selective transport of two or more species of the fluid stream in contact with the material or matrix or layer. "Nearly defect-free" as used herein means the absence of these non-selective pores to the degree that selective transport of two or more species of the fluid in contact with the membrane is achieved, e.g., at least 95% free of non-selective pores.

Dense: A term used here to describe a material or matrix or layer that has no micropores, mesopores, macropores, and/or macrovoids. According to IUPAC notation, micropores are small pores with diameters less than 2 nm or between 0.4 and 2 nm, mesopores have diameters between 5 and 50 nm, and macropores have diameters larger than 50 nm. As used herein, the term "micropore" refers to small pores with diameters less than 2 nm but greater than 0.4 nm. Thus, a dense material, matrix, or layer has no pores or voids with a diameter greater than 0.4 nm.

Dope: A solution comprising a polymer dissolved in a solvent or a solvent/non-solvent mixture.

Dope stabilizing agent: An agent that stabilizes a polymer solution in one or more solvents and/or a combination of one or more solvents and one or more non-solvents, and facilitates maintenance of a solubilized state.

Gas permeation unit (GPU): Gas permeance is a measure of how much gas is flowing across a membrane per unit of pressure differential. The term "gas permeation unit" refers to permeability divided by the thickness of the selective layer. $1 \text{ GPU}=3.3\times10^{-10} \text{ mol}/(m^2\text{-s-Pa})=10^{-6} \text{ cm}^3(STP)/(cm^2\text{-cmHg})$.

Inherent viscosity: The ratio of the natural logarithm of the relative viscosity to the mass concentration (g/dL) of the polymer, where relative viscosity is the viscosity of the solution divided by the viscosity of the neat solvent. Inherent viscosity is expressed in units of dL/g.

Macrovoid: A larger-diameter void formed within the porous substructure of a membrane. As used herein, the term macrovoid refers to a void having a volume and/or cross-sectional area that is at least 5-10× larger than an average pore volume and/or cross-sectional area of the porous substructure. A macrovoid may have a diameter, in the largest dimension, of at least 5 such as 5-100 μm.

Non-solvent: As used herein, the term "non-solvent" refers to a liquid that, at processing temperatures, dissolves no more than trace amounts of a given polybenzimidazole polymer when used alone.

Permeability: A material property that describes the rate at which a fluid (liquid and/or gas) traverses through a material, normalized by its thickness and the pressure driving force (typical unit=barrer; $1 \text{ barrer}=10^{-10} \text{ cm}^3\text{-cm}/(s\text{-cm}^2\text{-cmHg}))$.

Permeate: A fraction of a fluid (liquid and/or gas) that passes through a membrane.

Permselectivity: A term used to define the preferential permeation of certain species through a membrane and calculated as ratio of permeabilities or permeances of two species through a membrane Pore: One of many openings or void spaces in a solid substance of any kind. Pores are characterized by their diameters. As used herein, the term "micropore" refers to small pores with diameters less than 2 nm but greater than 0.4 nm. Porosity is a measure of the void spaces or openings in a material, and is measured as a fraction, between 0-1, or as a percentage between 0-100%.

Porous: A term used to describe a matrix or material that is permeable to fluids (such as liquids or gases). For example, a porous matrix is a matrix that is permeated by a network of pores (voids) that may be filled with a fluid. In some examples, both the matrix and the pore network (also known as the pore space) are continuous, so as to form two interpenetrating continua.

Retentate: A fraction of a fluid (liquid and/or gas) retained by a membrane.

Selective layer: A layer on the membrane which allows faster transport of one or more species as compared to other species present in the fluid stream in contact with the membrane.

Solvent: As used herein, the term "solvent" refers to a liquid in which a given polybenzimidazole polymer is soluble.

Solute: The minor component in a solution, dissolved in the solvent.

Synthesis gas (syngas): A fuel gas mixture comprising primarily hydrogen, carbon monoxide, and carbon dioxide. Syngas may further include steam, hydrocarbons, nitrogen, hydrogen sulfide, carbonyl sulfide, ammonia, oxygen, trace metals, or any combination thereof.

II. Polybenzimidazole Hollow Fibers and Membranes

Polybenzimidazole (PBI) as used herein refers to PBI, blends of PBI with other polymers, copolymers of PBI, and combinations thereof. Typical polymers of this class and their preparation are described, for example, in U.S. Pat. Nos. 3,737,042, 2,895,948 and R.E. 26,065, and *Journal of Polymer Science*, L, (1961) 511-539. The PBI polymers comprise recurring units of Formula 1, Formula 2, or a combination thereof.

Formula 1 is:

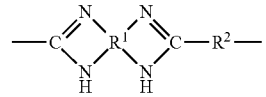

wherein $R^1$ is a tetravalent aromatic moiety with the nitrogen atoms, together with adjacent carbon atoms of $R^1$ (i.e. ortho carbon atoms of the aromatic moiety), forming a benzimidazole ring, and $R^2$ is (1) an aromatic ring, (2) an alkylene group, or (3) a heterocyclic ring from the group consisting of a) pyridine, b) pyrazine, c) furan, d) quinolone, and e) thiophene.

Formula 2 is:

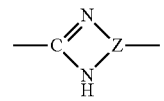

wherein Z is an aromatic moiety having the nitrogen atoms forming the benzimidazole ring paired with adjacent carbon atoms of the aromatic moiety.

Exemplary $R^1$ groups include, but are not limited to, phenyl, diphenyl, diphenylsulfone, diphenylether, diphenyl hexafluoropropane, naphthalene,

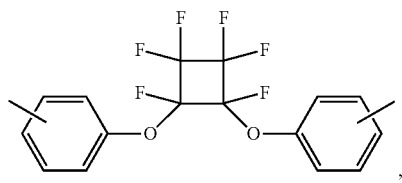

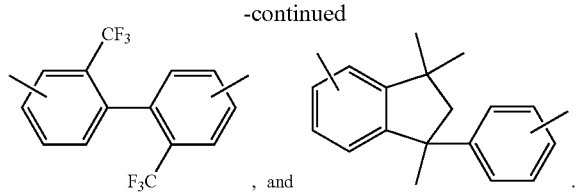, and

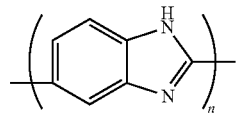

where Z is phenyl

In each of the foregoing formulas, n is any integer >0.

Exemplary $R^2$ and Z groups include, but are not limited to, the foregoing groups and cyclohexene. A person of ordinary skill in the art of organic chemistry understands that, in the foregoing structures, the bonds connecting $R^1$ and $R^2$ to the benzimidazole rings may be in any position on the illustrated rings. For example,

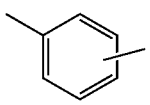

represents

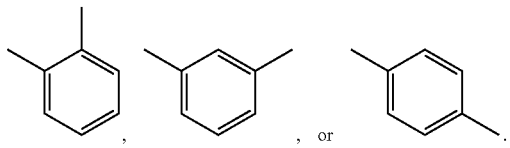

Exemplary PBI polymers according to Formula 1 or Formula 2 include:

a)

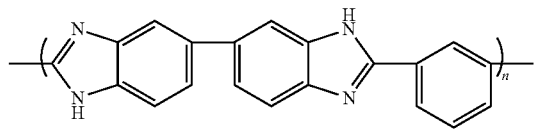

where $R^1$ and $R^2$ are diphenyl and phenyl, respectively;

b)

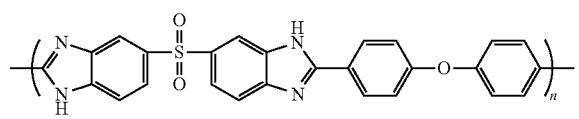

where $R^1$ and $R^2$ are diphenylsulfone and diphenylether, respectively;

c)

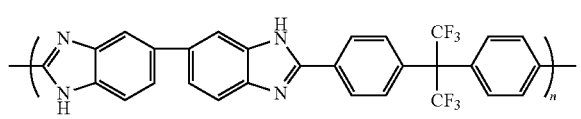

where $R^1$ and $R^2$ are diphenyl and diphenyl-hexafluoropropane, respectively; and Embodiments of the disclosed PBI hollow fibers have an integral thin selective layer and a porous underlying support structure. The selective layer is in intimate contact with the porous support structure, and typically is present on only one surface of the porous support structure. The selective layer can be dense or porous with a highly porous interconnected support structure comprising the remainder of the fiber wall. "Interconnected" as used herein means that not all pores are discrete, and the open space within a pore may contact the open space within one or more adjacent pores. The PBI asymmetric hollow fiber membrane with dense selective layer exhibits excellent gas separation performance with a high degree of chemical stability and mechanical robustness. The present disclosure provides a new type of asymmetric hollow fiber membranes, and the application of such membranes for gas separations and solute molecules removal from organic solvents and water.

A hollow fiber membrane, as used herein, refers to a thin selective multilayered hollow fiber having at least two layers. The hollow fiber may have one or more thin selective dense or porous layers. In one embodiment, the hollow fiber membrane is characterized as asymmetric membrane. In FIG. 1, there is shown a dual thin-layered hollow fiber membrane 5, with a defect-sealing layer 4, a dense or porous integrated selective layer 3, and a porous support structure 2. The thicknesses of the defect-sealing layer 4 and the integrated selective layer 3 are significantly thinner in comparison to the porous underlying support 2. The polymers of the sealing layer 4 and the integrated selective layer 3 may knit (or blend) together thereby forming a bond. A lumen 1 is formed within the hollow fiber membrane 5. The hollow fiber membrane has an outside diameter (OD), an inside diameter (ID) and wall thickness (WT). PBI hollow fibers consisting of defect-sealing layer 4 or dense integrated selective layer 3 or both, and porous support structure 2 are highly suitable for gas, vapor and liquid separation, dehydration of organic liquids, small molecular weight solute (up to 1000 Da) removal from organic liquid and water applications, while hollow fibers with only the integrated porous selective layer 3 and the porous structure 2 are highly suitable for large molecular weight solute (>1000 Da) and suspended particles removal from organic liquid and water. In an independent embodiment (not shown), the integrated selective layer is bore side, i.e., inward facing, and the porous support structure is shell side, i.e., outward facing.

In one embodiment the OD of the hollow fiber 5 is in the range of 50 to 3000 microns (μm), such as from 50 to 200 μm. In one embodiment, the porous support structure 2 has a highly interconnected porous structure with a thickness in the range of 10 to 1500 μm. In one embodiment the dense integrated selective layer 3 thickness is in the range of 0.1 to 5 μm, such as 0.1 to 0.25 μm. In one embodiment the dense sealing layer 4 thickness is in the range of 0.1 to 5 μm, such as 0.25 to 1 μm).

III. Methods Of Making PBI Hollow Fiber Membranes

A process of making PBI hollow fiber membranes may generally comprise: (1) preparing a polymer dope comprising (i) a polybenzimidazole (PBI) polymer, (ii) a dope stabilizing agent, and (iii) a mixture of a primary solvent A and a secondary solvent/non-solvent B; (2) preparing a bore fluid comprising a mixture of a solvent/non-solvent C and/or a solvent/non-solvent D; (3) extruding the PBI dope and bore fluid simultaneously through a spinneret consisting of a central bore tube and a concentric annular channel (i.e., a tube-in-orifice spinneret); (4) optionally passing the nascent hollow fiber through an air gap defined between the spinneret and coagulation bath; and (5) immersing the nascent hollow fiber into a coagulation bath comprising a solvent/non-solvent E and/or solvent/non-solvent F. The hollow fiber may then be taken up on a drum. In another embodiment, the process further includes a step of supercritical drying or sequential solvent exchange of imbibed coagulant or residual dope solvent in PBI hollow fiber with acetone or methanol or ethanol or isopropanol and then with hexane prior to drying, which prevents structure destruction due to capillary forces.

Polybenzimidazole (PBI) as used herein refers to PBI, blends of PBI with other polymers, copolymers of PBI, and combinations thereof. Typical polymers of this class and their preparation are explained in U.S. Pat. Nos. 3,737,042, 2,895,948 and R.E. 26,065, and *Journal of Polymer Science*, L, (1961) 511-539. The PBI polymers comprise recurring units selected from the group consisting of Formula 1 and Formula 2.

Formula 1 is:

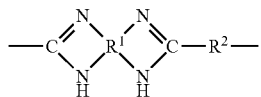

wherein $R^1$ and $R^2$ are as previously described.

Formula 2 is:

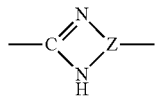

wherein Z is as previously described.

PBI refers to, for example, the product of the melt or solution polymerization of a tetra-amine (e.g., aromatic and heteroaromatic tetra-amino compounds) and a second monomer being selected from the group consisting of free dicarboxylic acids, alkyl and/or aromatic esters of dicarboxylic acids, alkyl and/or aromatic esters of aromatic or heterocyclic dicarboxylic acid, and/or alkyl and/or aromatic anhydrides of aromatic or heterocyclic dicarboxylic acid. Further details may be obtained from U.S. Pat. Nos. RE 26,065; 4,506,068; 4,814,530; and US Publication No. 2007/0151926, each of which is incorporated herein by reference.

In some embodiments, the aromatic and heteroaromatic tetra-amino compounds, used in accordance with the disclosed embodiments, are 3,3',4,4'-tetra-aminobiphenyl, 2,3,5,6-tetra-aminopyridine, 1,2,4,5-tetra-aminobenzene, 3,3',4,4'-tetra-aminodiphenylsulfone, 3,3',4,4'-tetra-aminodiphenyl ether, 3,3',4,4'-tetra-aminobenzophenone, 3,3',4,4'-tetra-aminodiphenyl methane, and 3,3',4,4'-tetra-aminodiphenyldimethylmethane, and their salts, in particular, their mono-, di-, tri-, and tetrahydrochloride derivatives.

The aromatic carboxylic acids used, in accordance with the disclosed embodiments, are dicarboxylic acids or its esters, or its anhydrides or its acid chlorides. The term "aromatic carboxylic acids" equally comprises heteroaromatic carboxylic acids as well. In some embodiments, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-napthalenedicarboxylic acid, diphenic acid, 1,8-dihydroxynaphthalene-3,6-dicarboyxlic acid, diphenyl ether-4,4'-dicarboxylic acid, benzophenone-4,4'-dicarboxylic acid, diphenylsulfone-4,4'-dicarboyxlic acid, biphenyl-4,4'-dicarboxylic acid, 4-trifluoromethylphthalic acid, 2,2-bis(4-carboxyphenyl) hexafluoropropane, 4,4'-((1,2,3,3,4,4-Hexafluorocyclo-butane-1,2-diyl)bis(oxy))dibenzoic acid, 4,4'-stilbenedicarboxylic acid, 4-carboxycinnamic acid, or their C1-C20-alkyl esters or C5-C12-aryl esters, or their acid anhydrides or their acid chlorides.

The heteroaromatic carboxylic acids used, in accordance with the disclosed embodiments, are heteroaromatic dicarboxylic acids or their esters or their anhydrides. The "heteroaromatic dicarboxylic acids" include aromatic systems that contain at least one nitrogen, oxygen, sulfur, or phosphorus atom in the ring. In some embodiments, it is pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine dicarboxylic acid, 3,5-pyrazole dicarboxylic acid, 2,6-pyrimidine dicarboxylic acid, 2,5-pyrazine dicarboxylic acid, 2,4,6-pyridine tricarboxylic acid, and benzimidazole-5,6-dicarboxylic acid, as well as their C1-C20-alkyl esters or C5-C12-aryl esters, or their acid anhydrides or their acid chlorides. In certain embodiments the aromatic and heteroaromatic diaminocarboxylic acid used in accordance with the disclosed embodiments is diaminobenzoic acid and its mono- and dihydrochloride derivatives.

In some embodiments, mixtures of at least 2 different aromatic carboxylic acids are used. These mixtures are, in particular, mixtures of N-heteroaromatic dicarboxylic acids and/or aromatic dicarboxylic acids or their esters. Non-limiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynapthalene-3,6-dicarboxylic acid, diphenyl ether-4,4'-dicarboxylic acid, benzophenone-4,4'-dicarboxylic acid, diphenylsulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidine dicarboxylic acid, and 2,5-pyrazine dicarboxylic acid. In certain embodiments, it is the diphenyl isophthalate (DPW) and its ester. The PBI may have an inherent viscosity (IV) in the range of 0.25 to 3.0 dL/g, such an IV within the range of 0.4 to 3.0 dL/g.

Examples of polybenzimidazoles which may be prepared according to the process as described above include:
poly-2,2'-(m-phenylene)-5,5'-bibenzimidazole;
poly-2,2'-(biphenylene-2"2"')-5,5'-bibenzimidazole;
poly-2,2'-(biphenylene-4"4"')-5,5'-bibenzimidazole;
poly-2,2'-(1",1",3"trimethylindanylene)-3"5"-p-phenylene-5,5'-bibenzimidazole;
2,2'-(m-phenylene)-5,5'-bibenzimidazole/2,2-(1",1",3"-trimethylindanylene)-5",3"-(p-phenylene)-5,5'-bibenzimidazole copolymer;
2,2'-(m-phenylene)-5,5-bibenzimidazole-2,2'-biphenylene-2",2"-5,5'-bibenzimidazole copolymer;
poly-2,2'-(furylene-2",5")-5,5'-bibenzimidazole;
poly-2,2'-(naphthalene-1",6")-5,5'-bibenzimidazole;
poly-2,2'-(naphthalene-2",6")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly(2,2'-(2,2'-bis(trifluoromethyl)-4,4'-biphenylene)-5,5'-bibenzimidazole);
poly-2,2"-(m-phenylene)-5,5"-di(benzimidazole)propane-2,2; and
poly-ethylene-1,2-2,2"-(m-phenylene)-5,5"-dibenzimidazole)ethylene-1,2
where the double bonds of the ethylene groups are intact in the final polymer. Poly-2,2'-(m-phenylene)-5,5'-bibenzimidazole, a preferred polymer, can be prepared by the reaction of 3,3',4,4'-tetraminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

In some embodiments, the polybenzimidazole for use in dope preparation is one from poly-2,2'-(m-phenylene)-5,5'-bibenzimidazole. The PBI dope, in one embodiment may be a solution of PBI in the range of 10 to 26 weight %, such as in the range of 13 to 23 wt %, or 16 to 20 wt %. In a particular embodiment, the polymer dope comprises 18 wt % PBI polymer.

The PBI polymer dope further comprises a dope stabilizing agent. Suitable dope stabilizing agents include inorganic salts, ionic liquids, and organic polymers. In some embodiments, the dope stabilizing agent is a lithium salt, polyvinylpyrrolidone, a polyethylene glycol, or a combination thereof. Exemplary dope stabilizing agents include lithium chloride (LiCl), lithium bromide (LiBr), lithium tetrafluoroborate (LiBF$_4$) and polyvinylpyrrolidone (PVP). In certain embodiments, the dope stabilizing agent is lithium chloride. The dope stabilizing agent concentration in PBI dope is in the range of 0.1 to 10 wt. %, such as in the range of 0.5 to 7 wt. % or 1 to 5 wt. %. In certain examples, the dope stabilizing agent concentration is 1 wt. %.

The solvents for PBI dope preparation comprises a mixture of a primary solvent A and a secondary solvent/non-solvent B. Primary solvent A comprises a polar aprotic solvent, an ionic liquid, or any combination thereof. Suitable aprotic solvents and ionic liquids include, but are not limited to, N,N-dimethylacetamide (DMAc), N-methyl-2-pyrrolidone (NMP), dimethylformamide (DMF), 1-ethyl-3-methylimidazolium acetate ([emim][Ac]) and 1-butyl-3-methylimidazolium acetate ([bmim][Ac]). In some embodiments, primary solvent A is DMAc, N-methyl-2-pyrrolidone (NMP) or 1-ethyl-3-methylimidazolium acetate ([emim][Ac]). In a particular embodiment, solvent A is DMAc. A secondary solvent/non-solvent B comprises a ketone, an organic nitrile, an alcohol, or any combination thereof. Suitable solvent/non-solvent B options include, but are not limited to, acetone (ACE), acetonitrile (ACN), methanol (MeOH), ethanol (EtOH), isopropanol (IPA) and n-propanol. In some embodiments, the weight ratio of solvent A to solvent/non-solvent B can be varied from 1 to 30. In some embodiments, solvent/non-solvent B is ACE or ACN. In a particular embodiment, solvent/non-solvent B is ACN. In one embodiment, the ratio of DMAc to ACN for dope preparation is in the range of 1 to 30, such as 2 to 8, or 2 to 4. In a particular embodiment, the ratio of DMAc to ACN is 2.35.

The bore fluid, in one embodiment, may be a mixture of one or more solvents and/or non-solvents for the polymers of the hollow fiber, wherein one type of solvent (solvent/non-solvent C) comprises a ketone, an organic nitrile, an alcohol, or any combination thereof. In some embodiments, solvent/non-solvent C comprises acetone, acetonitrile, methanol, ethanol, isopropanol, or n-propanol. In certain embodiments, solvent/non-solvent C comprises acetone (ACE) or acetonitrile (ACN). In a particular embodiments, solvent/non-solvent C is ACN. In some embodiments, the other type of solvent (solvent/non-solvent D) comprises a polar aprotic solvent, an ionic liquid, or any combination thereof. Suitable polar aprotic solvents and ionic liquids include, but are not limited to, N,N-dimethylacetamide, N-methyl-2-pyrrolidone, dimethylformamide, 1-ethyl-3-methylimidazolium acetate and 1-butyl-3-methylimidazolium acetate. In some embodiments, solvent/non-solvent D comprises dimethylacetamide, N-methyl-2-pyrrolidone or 1-ethyl-3-methylimidazolium acetate. In one embodiment, solvent/non-solvent D is N,N-dimethylacetamide.

In one embodiment, the volume ratio of solvent/non-solvent C to solvent/non-solvent D for bore fluid preparation is in the range of 15/85 to 100/0, such as 75/20 to 95/5, or 80/20 to 90/10. In a particular embodiment, the volume ratio is 85/15. In some embodiments, the bore fluid comprises acetonitrile and N,N-dimethylacetamide in a volume ratio of 15/85 to 100/0, 75/20 to 95/5, 80/20 to 90/10, or 85/15. In a particular embodiment, the bore fluid comprises acetonitrile and N,N-dimethylacetamide in a volume ratio of 85/15.

The ratio of bore flow rate to dope flow rate ratio is in the range of 0.5 to 5, such as 2 to 4. In a particular embodiment, the ratio is 3.5.

The coagulation and rinse baths comprise a mixture of one or more solvents and/or non-solvents for the PBI polymers. One type of solvent, solvent/non-solvent E comprises water, an alcohol, a ketone, an ester, an alkane, an organic nitrile, and any combinations thereof. In some embodiments, solvent/non-solvent E comprises methanol, ethanol, isopropanol, n-propanol, acetone, ethyl acetate, butyl acetate, hexanes, acetonitrile, water, or any combination thereof. In certain embodiments, solvent/non-solvent E comprises isopropanol, acetone, acetonitrile, water, or any combination thereof. Another type of solvent for coagulation and rinse baths is solvent/non-solvent F. Solvent/non-solvent F comprises a polar aprotic solvent, an ionic liquid, or any combination thereof. Suitable polar aprotic solvents and ionic liquids include, but are not limited to, N,N-dimethylacetamide, N-methyl-2-pyrrolidone, dimethylformamide, 1-ethyl-3-methylimidazolium acetate and 1-butyl-3-methylimidazolium acetate. In some embodiments, solvent/non-solvent F comprises dimethylacetamide, N-methyl-2-pyrrolidone or 1-ethyl-3-methylimidazolium acetate. In one embodiment, solvent/non-solvent F is N,N-dimethylacetamide. In a particular embodiment, the coagulation and rinse baths are water. In some embodiments, the coagulation and rinse baths have temperatures in the range 4 to 50° C., such as 10-40° C. In a particular embodiment, the coagulation and rinse baths have a temperature of 25° C.

Post treatment of the PBI hollow fiber may be performed. The post treatment may comprise supercritical drying and/or freeze drying and/or sequential solvent exchange. In some embodiments, post treatment comprises first performing sequential solvent exchange in (i) acetone or methanol or ethanol or isopropanol, and then (ii) in hexane. Following solvent exchange, the PBI hollow fiber is dried before use in separation processes. Post treatment is carried out to dry the fiber without damaging the original microstructure due to surface tension and capillary forces of the imbibed residual solvent, non-solvent, coagulants or rinse liquid. Solvent exchange and subsequent drying removes residual process liquids and stabilizes the fiber structure. The term "stabilizes" means that the fiber microstructure does not degrade significantly when handled, dried, used, or stored (e.g., in ambient conditions).

Figure 2:
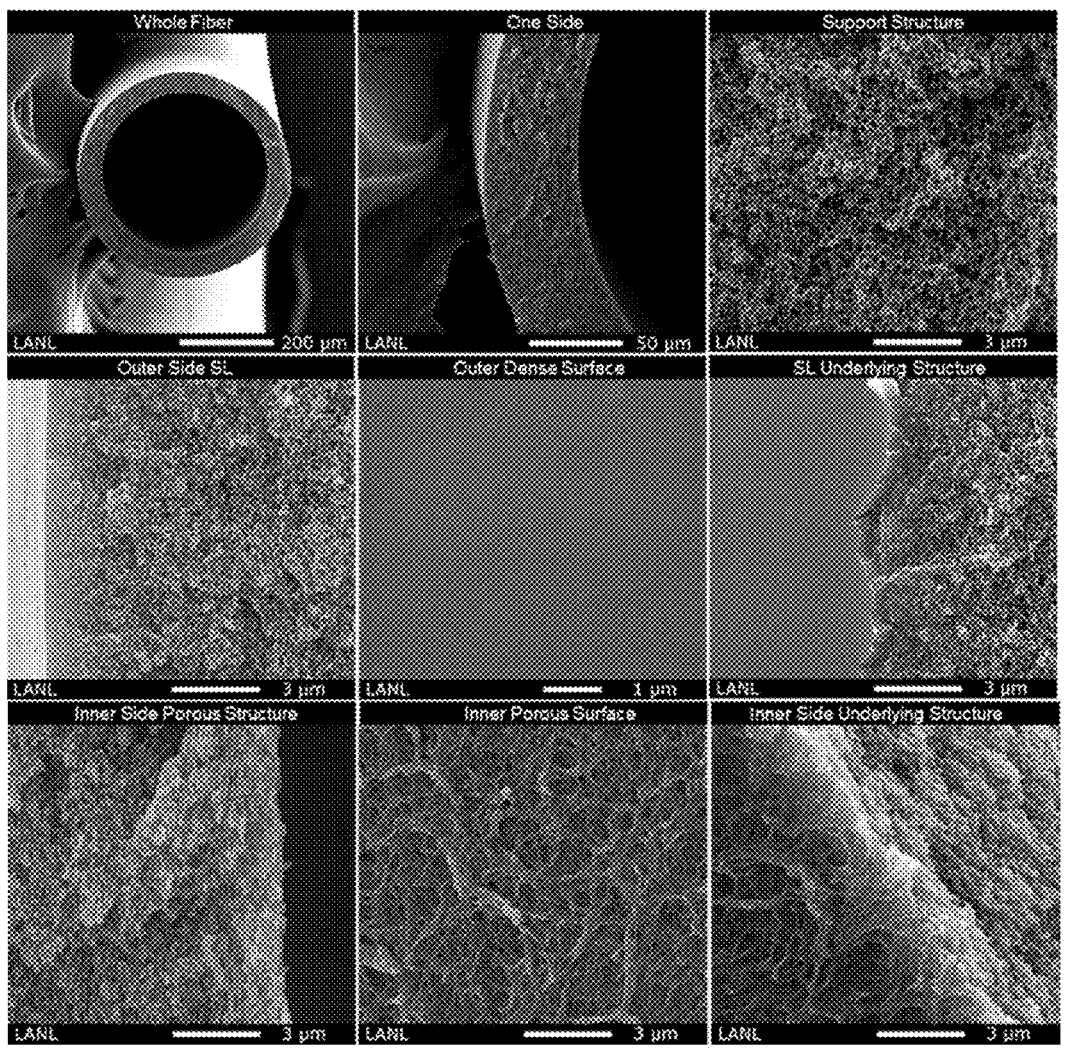
FIG. 2 shows SEM images of an exemplary PBI hollow fiber illustrating formation of an outer integrated thin selective layer and porous underlying support structure.

The PBI hollow fiber's microstructure, which is vital for applications in microfiltration, ultrafiltration, nanofiltration, pervaporation and gas separation membrane processes, may be controlled. In some embodiments, the microstructure of PBI fiber is controlled by varying the residence time in the air gap. The residence time is controlled via the air gap length and/or dope extrusion speed through the spinneret. The residence time may range from 0 to 20 seconds, such as from greater than 0 seconds to 20 seconds, 0.1-20 seconds, 1-20 seconds, 1-15 seconds, or 2-15 seconds. In some embodiments, the air gap has a length of 0 to 5 cm, such as from greater than 0 cm to 5 cm, greater than 0 cm to 3 cm, 0.1-5 cm, 0.1-3 cm, or 0.5-3 cm. The PBI hollow fiber with selective layer and porous underlying support structure is formed in one step by a phase inversion technique as shown in FIG. 2 (see Example 1). The position of the selective layer—shell side (see, e.g., FIG. 1) or bore side (not shown)—may be selected by the choice of bore fluid and coagulation bath components and compositions. A bore-side selective layer may be formed, e.g., by using solvent/non-solvent E and/or solvent/non-solvent F as the bore fluid and using a mixture of solvent/non-solvent B and solvent/non-solvent C as the coagulation bath. In a particular embodiment, the thickness of the outer integrated dense selective layer is varied between 0.1 to 5 μm, such as between 0.36 to 2.20 μm, by controlling the length of residence time in air gap as shown in FIG. 5 (see Example 4). In some embodiments, a dense selective layer with a thickness ≤0.30 μm, e.g., 0.1-0.3 μm, is formed by optimizing the fiber preparation parameters. In some embodiments, the thickness of the dense selective layer is controlled by varying the air gap length and the dope composition. The nearly defect-free, extremely thin selective layer thickness is highly preferable for high performance membrane separation. By "nearly defect-free" it is meant that the selective layer is completely or substantially (i.e., at least 95%) devoid of pores which result in non-selective transport of two or more species of the fluid in contact with the membrane. The feed components are selectively separated by the outer integrated selective layer while permeation rate of components is faster in the porous support structure than the selective layer. This type of PBI fiber is used for gas, vapor and liquid separation, catalytic membrane reactors, water desalination, and dehydration of organic liquids.

In another embodiment, a PBI hollow fiber with a porous selective layer and highly porous interconnected structure as shown in FIG. 8 (see Example 6) is prepared. This type of PBI fiber may be used for separating solute molecules and particulate matter from organic and aqueous liquids, and as catalytic membrane reactors.

In another embodiment, the PBI hollow fiber with a porous selective layer and highly porous interconnected structure as shown in FIG. 8 (see Example 6) is used as a membrane support platform where one or more selective layers is deposited using standard thin film deposition techniques such as dip-coating, spray-coating, chemical vapor deposition (CVD), atomic layer deposition (ALD), interfacial polymerization (IP), electro-less plating, and/or any combination thereof. In some embodiments, these deposited selective layers can be comprised of polymer (e.g. polyimide, polyamide, polyethersulfone, polysulfone, PBI, polyethylene glycol), inorganic (e.g. silica, alumina, carbides, nitrides, zirconia, amorphous and crystalline carbons), metallic materials (palladium and palladium alloys, gold and silver), and ionic liquids, and/or any combination thereof. In a particular embodiment, the selective layer deposited can be comprised of polymer forming the fiber (Example 10). In some embodiments, a sealing layer (Example 8, FIG. 10) may be deposited after the deposition of one or more selective layers.

The uniqueness of certain dope, bore and coagulation bath compositions, especially use of ACN as a dope and bore fluid additive for the novel PBI hollow fiber fabrication process claimed in this disclosure, is demonstrated here. In one embodiment, PBI hollow fibers were prepared from two other PBI dopes having the same PBI concentration as that of Membrane A (Table 1, Example 1) while keeping all other fiber preparation parameters same. These PBI dopes were prepared by replacing ACN additive with DMAc and NMP. FIG. 3 (Example 2) showed that PBI hollow fiber prepared from both dopes exhibited a dense layer at the outer side with an array of macrovoids in the fiber wall while the PBI fibers prepared with ACN additive was macrovoid free. Macrovoids are a highly undesirable structure for high performance separation as they are weak points often resulting in mechanical failure under high temperature and pressure operation.

In another embodiment, PBI hollow fibers were prepared by varying bore fluid composition, wherein ACN in an ACN/DMAc mixture was replaced with acetone (ACE), methanol (MeOH), ethanol (EtOH), or isopropanol (IPA). FIG. 4 (see Example 3) shows SEM images of PBI hollow fiber prepared using ACE/DMAc (85/15), MeOH/DMAc (85/15), EtOH/DMAc (85/15) and IPA/DMAc (85/15) as a bore fluids at 0.5 cm air gap illustrating formation of an outer integrated selective layer and porous underlying support structure except EtOH/DMAc (85/15) and array of macrovoids for ACE/DMAc (85/15). The PBI hollow fiber prepared from these bore fluids at zero air gap formed porous fibers with porous selective layer. These bore fluids can be used as alternative to ACN/DMAc mixture.

Figures 9A, 9B, 9C, 9D, 9E, 9F, 9G, 9H, 9I, 9J, 9K, 9L, 9M, 9N, 9O, 9P:
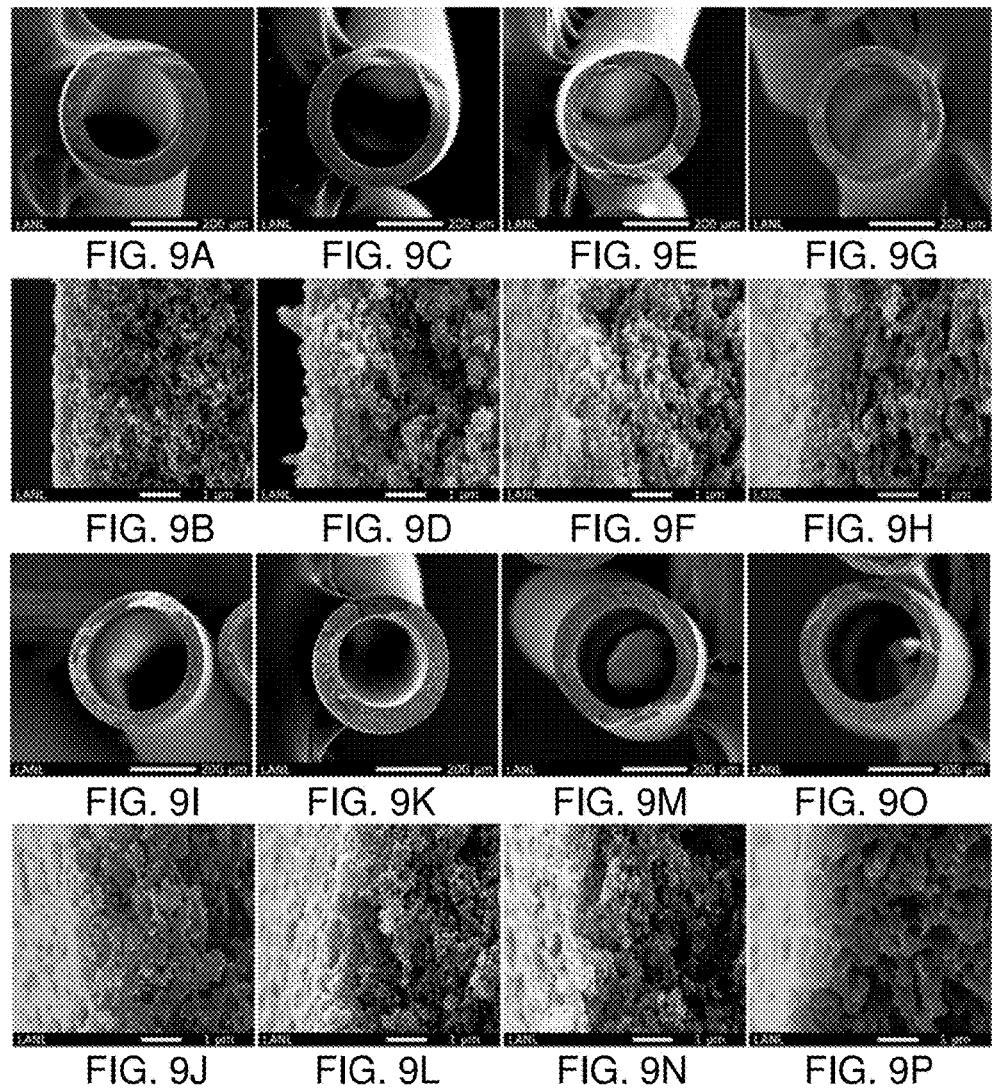
FIGS. 9A-9P are SEM images of PBI hollow fiber prepared in 9A-9B: water; 9C-9D: ACE; 9E-9F: MeOH; 9G-9H: EtOH; 9I-9J: IPA; 9K-9L: ACN; 9M-9N: EtAc and 9O-9P: hexane as outer coagulants, illustrating formation of porous structure throughout the fiber wall including outer layer where 9B, 9D, 9F, 9H, 9J, 9L, 9N and 9P are images of the outer layer of PBI hollow fibers.

In another embodiment, PBI hollow fibers were prepared in different coagulants consisting of acetone (ACE), methanol (MeOH), ethanol (EtOH), isopropanol (IPA), acetonitrile (ACN), ethyl acetate (EA) and hexane using parameters of an asymmetric PBI hollow fiber membrane with porous selective layer preparation. FIG. 9 (see Example 7) shows SEM images of PBI hollow fiber prepared in these outer coagulants illustrates the formation of porous structure throughout the fiber wall with a porous selective layer. These implicates that extensive variation of outer coagulants in term of polarity, viscosity and solubility is not affecting the microstructure of the PBI hollow fiber indicating the unique composition of the dope and bore fluid claimed here dictates the fiber structure.

In one embodiment, separation performance of PBI hollow fiber is improved using a thermal annealing technique, wherein annealing technique comprising: (a) annealing hollow fiber in inert and/or reactive environments at temperature in the range of 250 to 450° C. for varying lengths of time, and (b) cooling the fiber back to 250° C. after each step change. As used herein "inert environment" or "inert atmosphere" means an inert environment or atmosphere with respect to the PBI hollow fiber. As used herein "reactive environment" or "reactive atmosphere" means a reactive environment or atmosphere with respect to the PBI hollow fiber. Exemplary annealing atmospheres include argon, hydrogen, carbon dioxide, helium, ammonia, air, and nitrogen. In one embodiment, the hollow fiber is annealed in a nitrogen environment from 250 to 450° C. with step changes of 25° C. and hold time in the range of 0.5 to 24 hours at each step. Exemplary reactive environment include air and inert gas containing parts per million (ppm) to % levels of oxygen.

One aspect of present disclosure further comprises thermally and/or chemically crosslinking the PBI hollow fibers by annealing them at temperatures in the range of 250 to 600° C., such as in the range of 250-450° C., in inert or oxidizing environment, or by chemically crosslinking using crosslinking agent comprised of 1,4-$C_6H_4$XY, where X and Y are selected from $CH_2Cl$, $CH_2Br$, and $CH_2I$ or 3,4-dihalo-tetrahydro-thiophene-1,1-dioxide, where halo is selected from the group consisting of chloro, bromo, and iodo or dihalo alkane where halo is selected from the group consisting of chloro, bromo, and iodo for inter or intra molecular crosslinking. These hollow fibers are used for separating solute molecules and suspended particulate matter from organic solvents, and for gas separations. Annealing or cross-linking may enhance separation performance and/or solvent resistivity of the PBI hollow fibers compared to PBI hollow fibers that are not annealed or cross-linked.

To improve gas separation performance, a defect-sealing and/or protective layer is deposited to an outer side of a PBI hollow fiber consisting of an outer integrated selective layer and a porous underlying support structure. In some embodiments, the selective layer with porous underlying support structure hollow fiber is thermally processed or cross-linked by annealing at a temperature ≥250° C., such as a temperature from 250 to 450° C. or a temperature from 300 to 450° C., prior to the sealing layer deposition. In another embodiment the defect-sealing layer shown as 4 in FIG. 10 (see Example 8) is deposited using standard coating techniques (e.g. spray and dip coating). The defect sealing material comprises organic materials, inorganic materials, or any combination thereof, having higher intrinsic gas permeability as compared to the native PBI hollow fiber polymer. In a particular embodiment, the defect-sealing layer is a derivative of PBI. In one embodiment, the defect sealing layer is derivative of PBI containing bisphenyl-hexafluoropropane (6F-PBI) units wherein at least one of $R^1$ and $R^2$ in Formula 1 is:

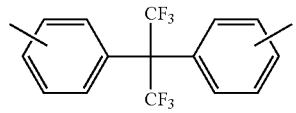

The deposition of a defect-sealing layer on PBI hollow fiber enhances separation performance.

Figure 16:
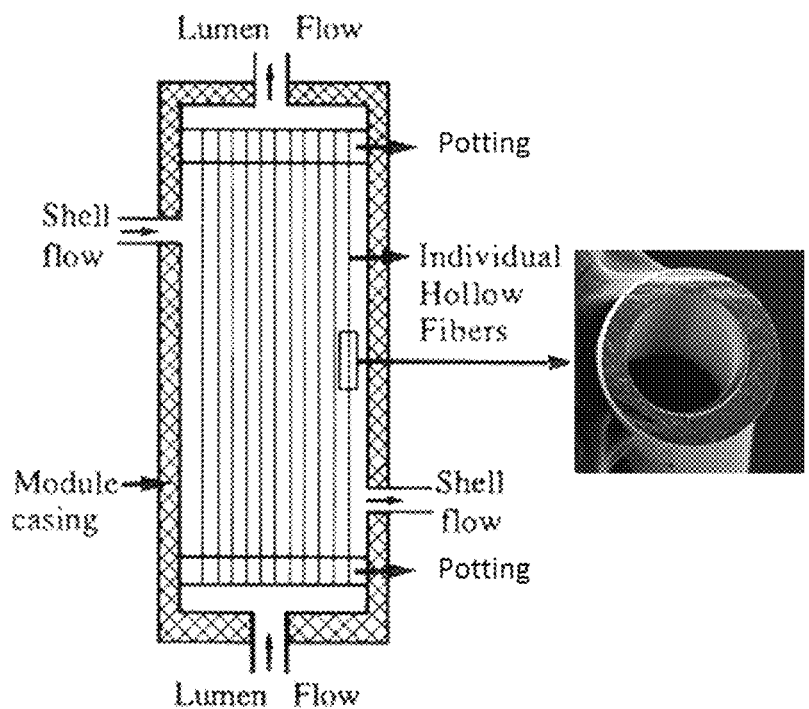
FIG. 16 is a schematic diagram of a representative hollow-fiber module used for gas, vapor, and liquid separation applications and an SEM image of an individual hollow fiber. Feed can be introduced at the shell or lumen side of the module. Sweep flow (when used) is introduced at the other location, i.e., if the feed is introduced on the shell side, the sweep would be introduced at the lumen side. Shell-side feed modules are generally used for high-pressure applications up to 1000 psig and below. Bore-side feed modules are generally used for medium-pressure feed streams up to 150 psig.

Upon the deposition of a defect-sealing layer or preparation of outer integrated dense selective layer and porous underlying support structure PBI hollow fiber or preparation of microporous PBI hollow fiber with highly porous interconnected structure, fibers are potted into a module with a shell and tube geometry for gas, vapor and liquid separations, solute and particulate removal from water and organic liquids, dehydration of organic liquids applications, or water desalination. FIG. 16 shows a representative hollow fiber module. Industry standard epoxy or polyurethane resin can be used as potting materials for making the modules. In one embodiment of making high temperature PBI hollow fiber modules, the PBI dope is used as the potting materials. The chemical resistivity of PBI potting material can be further enhanced by thermal or chemical cross linking techniques for application in harsh chemical and high temperature environments. Further details are available in U.S. Pat. Nos. 6,997,971 and 6,946,015.

IV. Methods Of Using PBI Hollow Fiber Membranes

In one embodiment, PBI hollow fiber membranes with an outer integrated dense selective layer and porous underlying support structure as disclosed herein are used for gas separation wherein said PBI hollow fiber membrane is a heat resistant membrane and is operable up to 400° C., such as within a range of 100 to 400° C. Similarly, embodiments of the disclosed hollow fiber membrane modules are operable at temperature up to 400° C. Embodiments of the disclosed asymmetric PBI hollow membranes have high separation properties at high temperature, and thermal, mechanical and chemical robustness. In one embodiment, the membrane is operable at temperatures up to 400° C., such as temperatures from 20 to 400° C. In a particular embodiment, the membrane is capable of separating hot gases or vapors, where the temperature is in the range of about 30 to 400° C. In addition, the membrane is also resistant to chemical degradation which includes resistant to changes in its structure and membrane function as a result of treatment with mercury, steam, hydrogen sulfide, carbonyl sulfide, carbon monoxide, fly-ash, sulfur oxides (SOx), nitrogen oxides (NOx), particulate matter and acid gases.

In an independent embodiment, a method of selectively separating and recovering at least one type of gas from a mixed gas or vapor comprises feeding the mixed gas or vapor to a first, or feed, side of a membrane comprising an asymmetric PBI hollow fiber fabricated as disclosed herein, whereby at least one gas or vapor of the mixed gas or vapor is selectively passed through the membrane to the permeate side. The method may further comprise drawing a vacuum on the permeate side or sweeping the permeate side with an inert gas or steam. In some embodiments, feeding the mixed gas or vapor to the first side of the membrane comprises contacting the integral selective layer of the PBI hollow fiber membrane with the mixed gas or vapor. In such embodiments, the porous support structure is the permeate side of the PBI hollow fiber membrane. Another aspect of the present disclosure is directed to a method for selectively separating and recovering a particular gas from a mixed gas containing two or more gases or vapors, where the method comprises passing said gas or vapor through a PBI hollow fiber membrane made by the process as described above.

Embodiments of the disclosed PBI hollow fiber membranes are suitable for high-purity hydrogen production, carbon dioxide capture, water gas shift reactor, chemical manufacturing, power generation, syngas cleanup, Fischer Tropsch liquids, fuel cells, refinery applications, water/organic separations, water/acid separation, brine treatment, desalination and the like. These asymmetric PBI hollow fibers prepared according to the disclosed embodiments have a great application value in industry. The hollow fiber asymmetric membrane obtained by the methods disclosed herein can be used to separate a variety of gases, including steam, hydrogen gas, carbon dioxide, oxygen gas, nitrogen gas, methane, C1-C4 hydrocarbons, heavier hydrocarbons, carbon monoxide, hydrogen sulfide and hot mixed gases or vapors that contain organic compounds. In a particular example, the asymmetric hollow-fiber gas separation membrane as disclosed herein is used to separate hot mixed gases or vapors that contain organic compounds.

The asymmetric PBI hollow fiber membrane of the present disclosure is suitable as a practical high performance gas separation membrane. In one example, separation between hydrogen gas and a hydrocarbon gas, e.g., methane gas, separation between hydrogen gas and carbon dioxide gas, separation between hydrogen gas and nitrogen gas, separation between helium gas and nitrogen gas, separation between carbonic acid gas and methane gas, separation between oxygen gas and nitrogen gas, and the like can be accomplished advantageously. In a particular example, the asymmetric hollow fiber membrane of the present disclosure is used to separate components in syngas, natural gas, coal gas, petrochemical stream, city gas, diesel fuel, gasoline, LPG, jet fuel, reformate gas, naphtha and mixtures thereof.

Figure 11A:
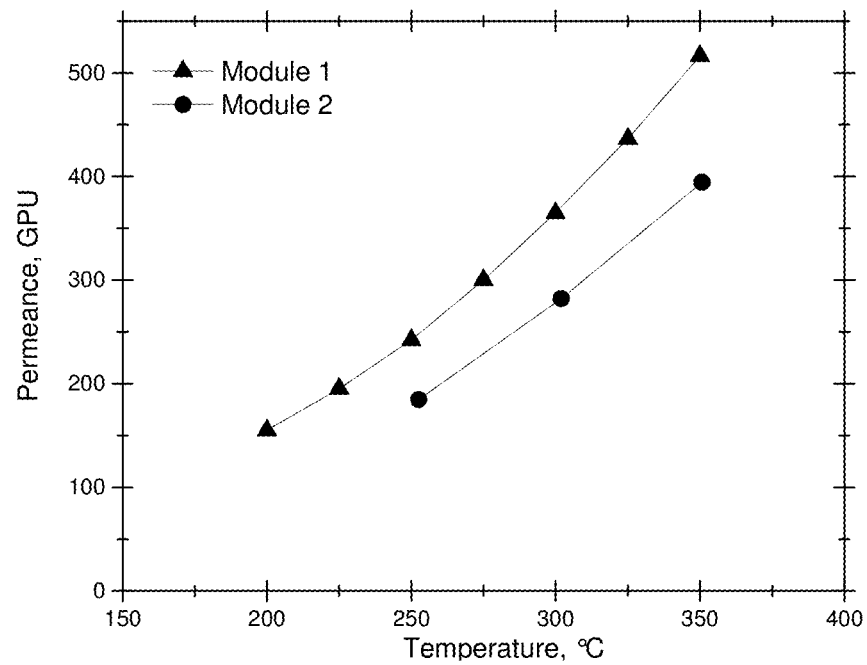
FIGS. 11A and 11B are graphs of $H_2$ permeance and $H_2/CO_2$ selectivity, respectively, as a function of temperature measured for PBI hollow fibers with integrated thin dense selective layer and porous support structure.

In some embodiments, a method for hydrogen purification and carbon dioxide separation from synthesis gas comprises the steps of: feeding synthesis (syn) gas stream to the shell side (integral selective layer side) of the hollow fiber module, drawing a vacuum or sweeping with inert gas (e.g. nitrogen, argon) or steam on the lumen side (porous support structure side) of the hollow fiber, and preferentially transporting hydrogen across the membrane to permeate side while retaining carbon dioxide on the feed side. In one embodiment, the method comprises: (a) providing a syngas stream comprising hydrogen, carbon monoxide, carbon dioxide, steam, methane, nitrogen, hydrogen sulfide, carbonyl sulfide, ammonia and oxygen, (b) passing the syngas stream on the outer side of a polybenzimidazole hollow fiber as disclosed herein at a pressure from 20 to 1000 psi, and a temperature from 100 to 400° C. and (c) condensing gaseous water from permeate and retentate stream before storage in large vessels. Embodiments of the disclosed PBI hollow fibers may exhibit a hydrogen permeance of >100 GPU, such as >110 GPU, and a hydrogen to carbon dioxide selectivity >15, such as ≥20, at 250° C., e.g., as shown in FIG. 11 (see Example 9). A single stage or multistage hollow fiber separation may be used for hydrogen production and/or carbon dioxide capture from syngas. The multistage hollow fiber separations are used for high purity hydrogen production from syngas. As used herein, the term "multistage" refers to the use of two or more membrane stages in series where any combination of permeate and or feed stream recycle process schemes may be employed between stages. Embodiments of the disclosed PBI hollow fiber membranes exhibit gas separation performance in which the permselectivity for hydrogen/carbon dioxide is from about 5 to 50 and the hydrogen/nitrogen permselectivity is from about 20 to 700.

Figure 12:
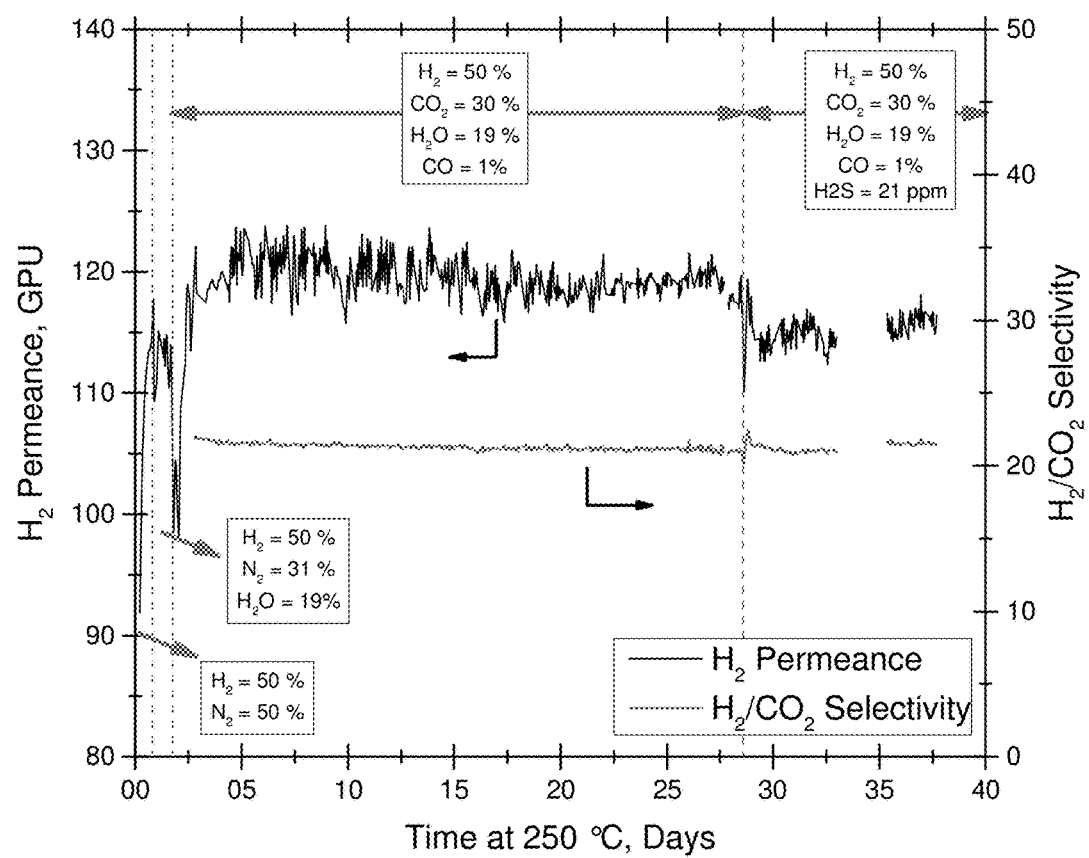
FIG. 12 shows long term durability of the FBI hollow fiber membrane evaluated in simulated wet syngas at 250° C. with and without $H_2S$.

Embodiments of the disclosed PBI hollow fibers are hydrogen sulfide-resistant, e.g., exhibiting a tolerance to 1% hydrogen sulfide present in a gas stream. In another example, PBI hollow fiber tested in syngas feed stream consisting 20 ppm hydrogen sulfide showed no performance degradation over time as shown in FIG. 12. In some embodiments, no substantial performance degradation occurred over a period of at least 20 days, at least 20 days, at least 30 days, or even at least 40 days for the PBI hollow fiber membrane exposed to syngas containing hydrogen sulfide.

Figure 15:
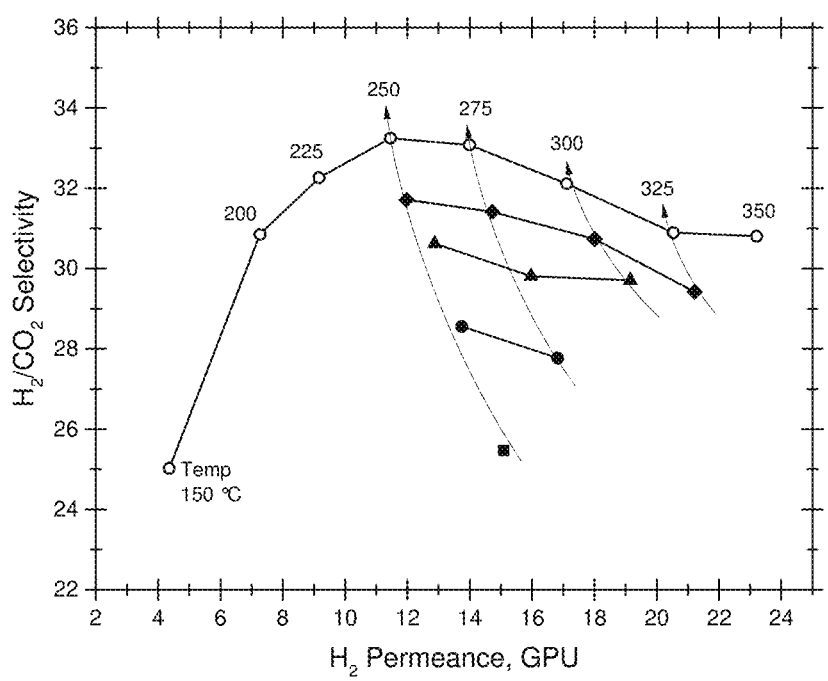
FIG. 15 is a graph of pure gas $H_2$ permeance and $H_2/CO_2$ selectivity of an asymmetric PBI hollow fiber membrane measured as a function of temperature after 24 hour additive annealing in inert atmosphere at temperatures exceeding 250° C.

In one embodiment, separation performance of PBI hollow fiber is improved using a thermal annealing technique at temperature in the range of 250 to 450° C. In particular example, PBI hollow fiber is annealed gradually from 250 to 450° C. with step change of 25° C. and hold time in the range of 0.5 to 24 hours at each step followed by cooling back the fiber to 250° C. after each step change. Hydrogen to carbon dioxide selectivity is improved approximately 30% from initial selectivity of 25 to final selectivity of 33 as shown in FIG. 15.

The asymmetric PBI hollow fiber membrane of the present disclosure also is suitable for the separation of water and an organic liquid and/or the separation of impurities from water. In one embodiment, the membrane is used for purification and/or concentration of high salinity brines such as those encountered in produced water streams from oil and gas operations, $CO_2$ sequestration and geothermal energy production operations. Purification of these brines may involve reduction of the brine (salt) content and/or organic matter content of the permeate to various levels (including complete removal) compared to that of the feed stream. Concentration of these brines may involve increasing the brine (salt) content and/or organic matter content to various levels in the retentate compared to that of the feed stream. The asymmetric PBI hollow fiber membrane of the present disclosure further is suitable for use in nano-, micro- and hyper-filtration, and reverse osmosis processes.

V. Examples

The following examples are provided to illustrate one or more embodiments of the disclosure, and are not intended to limit the disclosure in any way.

Example 1

A 18 wt. % polymer dope using DMAc as primary solvent and ACN was used for fiber preparation. This solution was obtained by diluting, with ACN and DMAc, a commercially available solution of PBI/DMAc (26 wt. % PBI, 72.5 wt. % DMAc and 1.5 wt. % LiCl) from PBI Performance Products, Inc., Charlotte, N.C. As given in Table 1, the ACN/PBI ratio (weight) was maintained at 1.34. The bore fluid consisted of a mixture of 85/15 (v/v) ACN/DMAc. After extrusion from the spinneret, the nascent hollow fibers were passed through an air gap into a coagulation bath consisting deionized water. The fibers were rinsed for 1 day in deionized water to remove residual solvent and air dried after sequential solvent exchange with acetone followed by hexane and stored in ambient environment. The PBI hollow fiber was labeled as Membrane A and the spinning parameters used for PBI hollow fiber preparation is listed in Table 1. The scanning electron micrographs (SEM) of Membrane A shown in FIG. 2 show a macrovoid-free PBI hollow fiber with outer integrated selective layer and porous underlying support structure. The thickness of outer integrated dense selective layer was measured at approximately 0.38 μm. The unique composition of the dope and optimized spinning parameters provided a highly desirable structure for gas, vapor and liquid separations.

TABLE 1

| Parameters | Membrane A |
|---|---|
| % PBI in Dope | 18 |
| Solvent A | DMAc |
| Non-Solvent B | ACN |
| ACN/PBI Ratio in PBI Dope | 1.34 (by weight) |
| Bore Fluid | ACN/DMAc (85/15) |
| Outer Coagulant | Water |
| Dope flow rate, mL/h | 10 |
| Bore fluid flow rate, mL/h | 35 |
| Air gap, cm | 0.5 |
| Spinneret dimensions, ID1/OD1/ID2, μm | 203/355/508 |

Example 2

To further investigate the uniqueness of ACN additive to the PBI dope, non-solvent B (ACN) in example 1 was replaced by DMAc and NMP, while all other compositional and spinning parameters were held constant. The dope compositions and spinning conditions are given in Table 2. The bore fluid consisted of a mixture of 85/15 (v/v) ACN/DMAc. Membrane B, C and D were labeled for PBI hollow fibers prepared from PBI dope solution with ACN, DMAc and NMP dilution, respectively. The SEM images of Membrane B, C and D shown in FIGS. 3A-3C, 3D-3F, and 3G-3I, respectively; Membrane B exhibited a macrovoid-free hollow fiber with selective layer formation at the outer side, while Membrane C and D exhibited an array of macrovoids in fiber wall. Macrovoids are highly undesirable structures for high performance separation as they are weak points often resulting in mechanical failure under high temperature and pressure operation.

TABLE 2

| Parameters | Membrane B | Membrane C | Membrane D |
|---|---|---|---|
| Solvent A | DMAc | DMAc | DMAc |
| Solvent/Non-Solvent B | ACN | — | NMP |
| Dope Dilution Solvent/PBI Ratio (by weight) | 1.34 | — | 1.34 |
| Dope flow rate, mL/h | 20 | 20 | 20 |
| Bore fluid flow rate, mL/h | 70 | 70 | 70 |
| Air gap, cm | 0.5 | 0.5 | 0.5 |
| Spinneret dimensions, ID1/OD1/ID2, μm | 203/355/508 | 203/355/508 | 203/355/508 |
| Take-up speed, m/min | 2.54 | 2.54 | 2.54 |

Example 3

Similarly to investigate the uniqueness of ACN additive to the bore fluid consisting ACN/DMAc mixture in Example 1, ACN in the bore fluid was replaced by acetone, methanol, ethanol or isopropanol, while keeping all other parameters same. The spinning parameters used for PBI hollow fiber preparation are listed in Table 3. The PBI hollow fibers prepared from ACE/DMAc (85/15 v/v), MeOH/DMAc (85/15), EtOH/DMAc (85/15) and IPA/DMAc (85/15) as a bore fluids were labeled as Membrane E, F, G and H, respectively. SEM images of Membranes B (FIGS. 4A-4C), E (4D-4F), F (4G-4I), G (4J-4L) and H (4M-4O) show PBI hollow fibers with an outer integrated selective layer and a porous underlying support structure for all bore fluid composition except the EtOH/DMAc mixture. The outer integrated dense selective layers of Membrane E (4E), F (4H) and H (4N) were thicker than that for Membrane B (4B).

TABLE 3

| Parameters | Membrane E | Membrane F | Membrane G | Membrane H |
|---|---|---|---|---|
| Bore Composition (85/15 v/v) | ACE/DMAc | MeOH/DMAc | EtOH/DMAc | IPA/DMAc |
| Dope flow rate, mL/h | 20 | 20 | 20 | 20 |
| Bore fluid flow rate, mL/h | 70 | 70 | 70 | 70 |
| Air gap, cm | 0.5 | 0.5 | 0.5 | 0.5 |
| Spinneret dimensions, ID1/OD1/ID2, μm | 203/355/508 | 203/355/508 | 203/355/508 | 203/355/508 |
| Take-up speed, m/min | 2.54 | 2.76 | 2.55 | 2.55 |

Example 4

Controlling selective layer thickness is vital for preparation of high performance PBI hollow fibers. The outer integrated selective layer thickness of PBI hollow fiber was varied using varying lengths of the air gap. The same 18 wt. % PBI solution of Example 1 used. The bore fluid consisted of a mixture of 85/15 (v/v) ACN/DMAc, while the outer coagulant was deionized water. The spinning parameters used for PBI hollow fiber preparation are listed in Table 4. The PBI hollow fibers prepared at 0, 0.5, 1, 2 and 3 cm air gap were labeled as Membranes I, J, K, L and M, respectively. SEM images of PBI hollow fiber showed in FIGS. 5A-5E illustrate no dense selective layer formation at 0.0 cm (FIG. 5A), while an increase in the selective layer thickness observed as air gap lengths increased from 0.5 to 3 cm (FIGS. 5B-5E).

TABLE 4

| Parameters | Membrane I | Membrane J | Membrane K | Membrane L | Membrane M |
|---|---|---|---|---|---|
| Air Gap, cm | 0.0 | 0.5 | 1.0 | 2.0 | 3.0 |
| Dope flow rate, mL/h | 10 | 10 | 10 | 10 | 10 |
| Bore fluid flow rate, mL/h | 20 | 20 | 20 | 20 | 20 |
| Spinneret dimensions, ID1/OD1/ID2, μm | 203/355/508 | 203/355/508 | 203/355/508 | 203/355/508 | 203/355/508 |

Example 5

Figure 6:
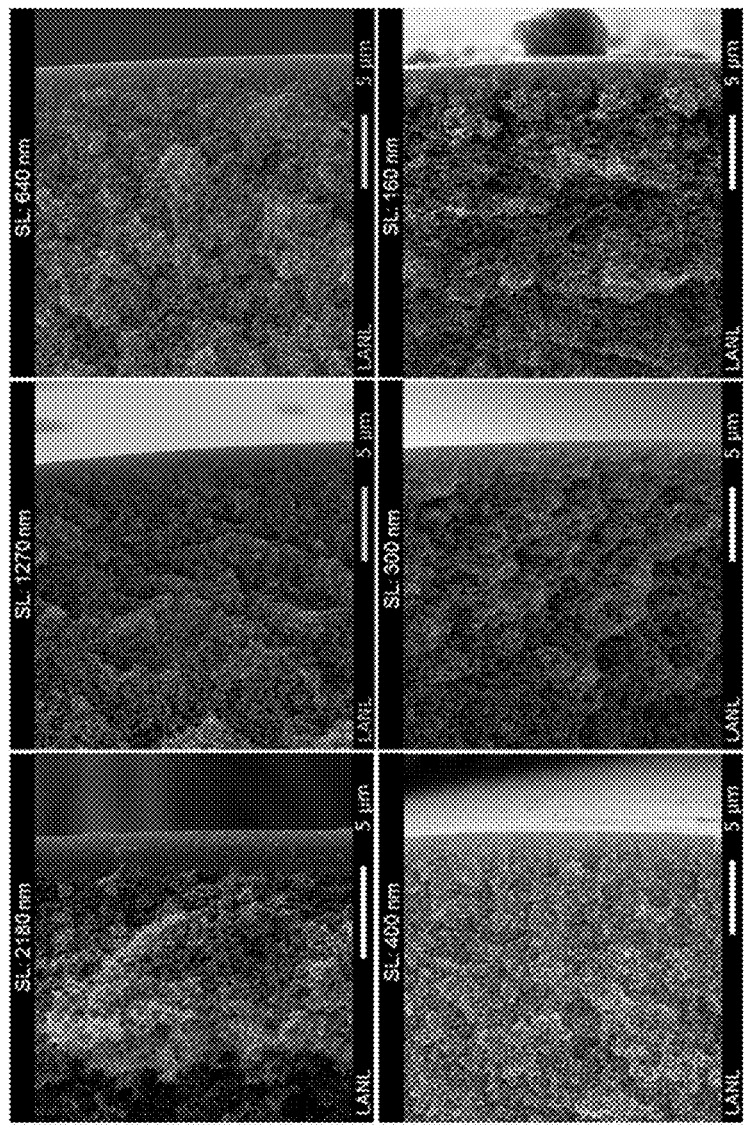
FIG. 6 shows SEM images obtained at 12,000× magnification of the outer layer of PBI hollow fibers prepared at spinning and dope conditions listed in Table 5 illustrating ability to precisely control dense selective layer thickness.
Figure 7:
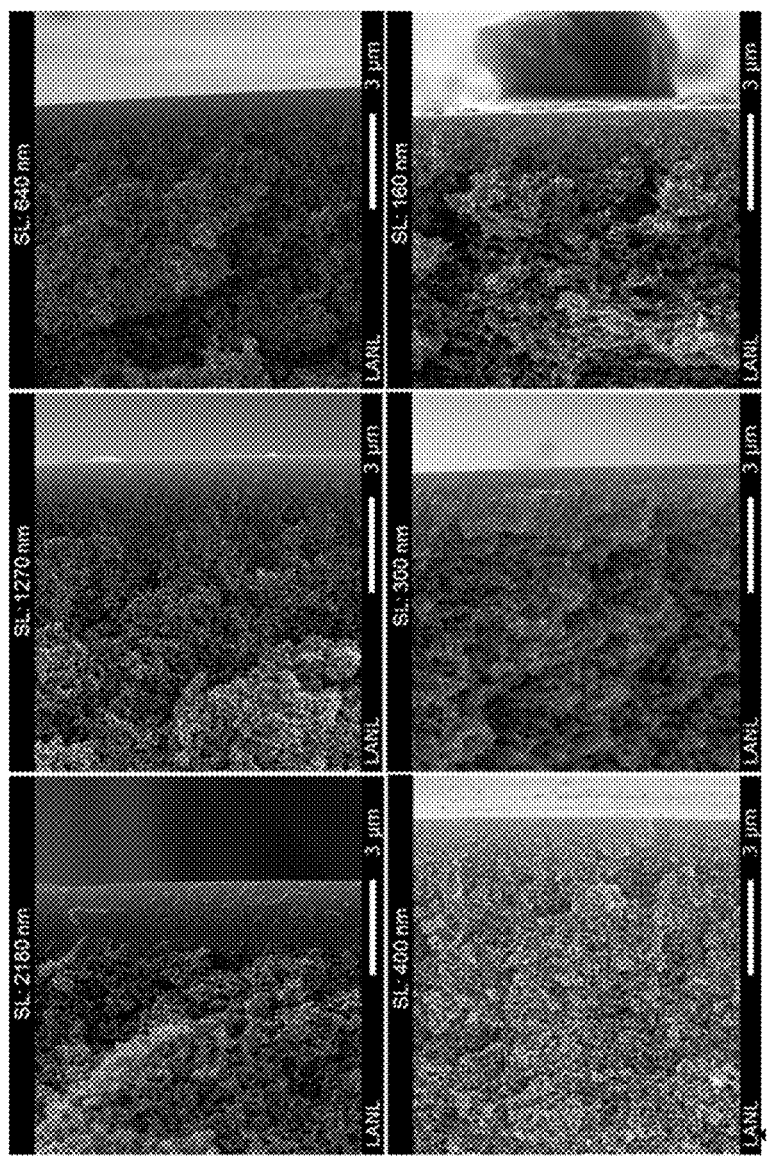
FIG. 7 shows SEM images obtained at 25,000× magnification of the outer layer of PBI hollow fibers prepared at spinning and dope conditions listed in Table 5 illustrating ability to precisely control dense selective layer thickness.

In this example, the tunability of the developed fiber spinning process to precisely control selective layer thickness is demonstrated. The dope compositions and spinning parameters are listed in Table 5. FIGS. 6 and 7 show SEM images demonstrating ability to control selective layer thickness from 2180 to 160 nm.

TABLE 5

| Parameters | Membrane N | Membrane O | Membrane P | Membrane Q | Membrane R | Membrane S |
|---|---|---|---|---|---|---|
| Air Gap, cm | 3.0 | 2.0 | 0.5 | 0.5 | 0.5 | 0.5 |
| Dope Conc. wt % | 18.0 | 18.0 | 21.5 | 18.0 | 18.0 | 18.0 |
| Dope flow rate, mL/h | 10 | 10 | 10 | 10 | 8 | 20 |
| Bore fluid flow rate, mL/h | 20 | 20 | 30 | 35 | 8 | 70 |
| Spinneret dimensions, ID1/OD1/ID2, μm | 203/ 355/ 508 | 203/ 355/ 508 | 203/ 355/ 508 | 203/ 355/ 508 | 203/ 355/ 508 | 230/ 355/ 508 |
| Measured Thickness, nm | 2180 | 1270 | 640 | 400 | 300 | 160 |

Example 6

PBI hollow fiber with porous selective layer was prepared from 18 wt. % PBI solutions with ACN and DMAc as solvent A and non-solvent B in such a way that the ACN/PBI ratio was maintained at 1.34. The bore fluid and outer coagulant bath consisted of ACN/DMAc, 85/15 (v/v) and water respectively. The spinning parameters used for PBI hollow fiber preparation are listed in Table 6. The PBI hollow fiber was labeled as Membrane T. SEM images of Membrane T shown in FIGS. 8A-8E illustrate a porous interconnected support structure, porous inner surface and an outer porous selective layer. This type of membrane can be used for separation of dissolved solids, solute molecules and suspended particles from fluids

TABLE 6

| Parameters | Membrane T |
|---|---|
| Outer Coagulant | Water |
| Dope flow rate, mL/h | 10 |
| Bore fluid flow rate, mL/h | 35 |
| Air gap, cm | 0.0 |
| Spinneret dimensions, ID1/OD1/ID2, μm | 203/355/508 |

Example 7

To investigate outer coagulant fluids, PBI hollow fibers were prepared in various coagulants consisting of acetone (ACE), methanol (MeOH), ethanol (EtOH), isopropanol (IPA), acetonitrile (ACN), ethyl acetate (EA) or hexane. The same 18 wt. % PBI solution with ACN additive as of Example 6 was used. The bore fluid was consisted of a mixture of 85/15 (v/v) ACN/DMAc. The PBI hollow fibers prepared in acetone, methanol, ethanol, isopropanol, acetonitrile, ethyl acetate or hexane as outer coagulants were labeled as Membrane U, V, W, X, Y, Z and AA, respectively. The spinning parameters used for PBI hollow fiber preparation are listed in Table 5. SEM images of membranes U, V, W, X, Y, Z and AA are shown in FIGS. 9A-9B, 9C-9D, 9E-9F, 9G-9H, 9I-9J, 9K-9L, 9M-9N, and 9O-9P, respectively, illustrating a porous interconnected structure support structure and an outer porous selective layer.

TABLE 7

| | Membrane Type | | | | | | |
|---|---|---|---|---|---|---|---|
| Parameters | U | V | W | X | Y | Z | AA |
| Outer Coagulant | ACE | MeOH | EtOH | IPA | ACN | EA | Hexane |
| Dope flow rate, mL/h | 10 | 10 | 10 | 10 | 10 | 10 | 10 |
| Bore fluid flow rate, mL/h | 35 | 35 | 35 | 35 | 35 | 35 | 35 |
| Air gap, cm | 0.0 | 0.0 | 0.0 | 0.0 | 0.0 | 0.0 | 0.0 |
| Spinneret dimensions, ID1/OD1/ID2, μm | 203/ 355/ 508 | 203/ 355/ 508 | 203/ 355/ 508 | 203/ 355/ 508 | 203/ 355/ 508 | 203/ 355/ 508 | 203/ 355/ 508 |

Further, the porosity of these membranes was confirmed from nitrogen permeation measured at ambient temperature (23-26° C.) by pressurizing the inside of the fiber at approximately 5 psig. Table 8 shows measured nitrogen flux in sccm/psi-cm of hollow fiber at room temperature. This type membrane can be used for separation of dissolved solids as well as suspended particles from liquids and as a high temperature porous support for composite membrane preparation. In comparison, no measurable $N_2$ flux was observed for a PBI hollow fiber membrane with dense selective layer (FIG. 2, Example 1).

TABLE 8

| Membrane | $N_2$ Flux sccm/psi-cm |
|---|---|
| Membrane I | 0.52 |
| Membrane J | 0.47 |
| Membrane K | 0.68 |
| Membrane L | 0.46 |
| Membrane M | 0.35 |
| Membrane N | 0.22 |
| Membrane O | 0.42 |
| Membrane P | 0.52 |

Example 8

To improve the separation of performance of PBI hollow fiber, a defect-sealing layer was deposited on the outer side of the fiber using an ultrasonic atomization-assisted spray-coating technique. The coating material was selected from chemically and thermally stable PBI derivatives having higher permeability than that of the native PBI hollow fiber polymer. Prior to coating, the PBI hollow fiber was thermally annealed in a nitrogen environment at 380° C. in tubular furnace for 1 hr. This was intended for thermal cross-linking of the PBI hollow fiber; thereby enhancing solvent resistivity to the organic solvents of the defect-sealing layer solution. In this example, 0.4 wt. % 6F-PBI solution in DMAc was used for spray coating on the annealed PBI hollow fiber. The coating layered was dried in-situ during coating using an infra-red lamp. FIGS. 10A-10E illustrate a thin 6F-PBI layer on the outer side of the integrated selective layer of the PBI hollow fiber. FIGS. 10A-10E also illustrate that the porous microstructure of the fiber was preserved after thermal annealing and defect sealing deposition steps.

Example 9

Figure 11B:
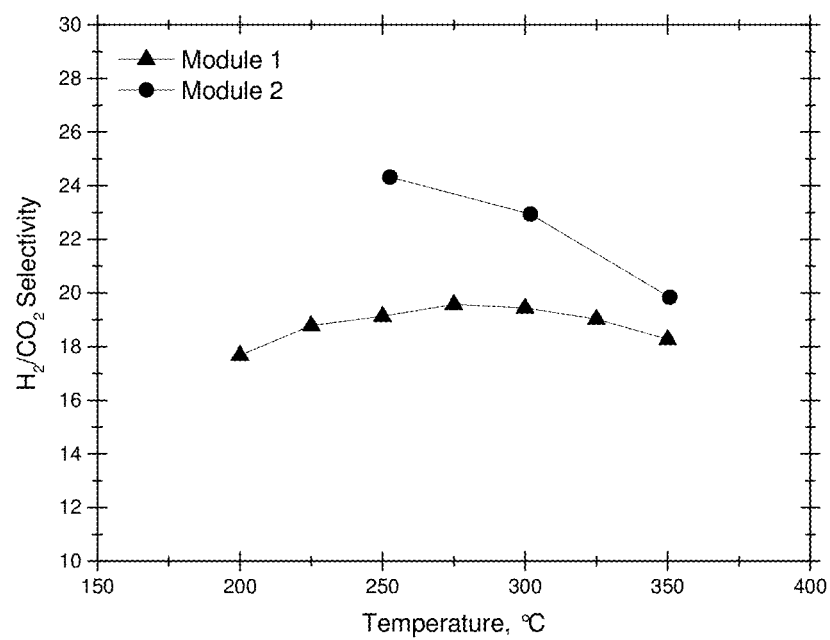

Two membrane modules were assembled using PBI hollow fiber of Example 1 with an outer integrated thin selective layer and a porous underlying support structure after defect-sealing layer deposition. PBI dope was used as the potting material for the module fabrication. The modules were initially heated up to 250° C. in a pure nitrogen environment. At 250° C., the pure gas $H_2$ permeance and $H_2/CO_2$ and $H_2/N_2$ selectivity measured for Module 1 were 242 GPU, and 19.1 and 46.4, respectively. For module 2, the pure gas $H_2$ permeance and $H_2/CO_2$ and $H_2/N_2$ selectivity measured for Module 1 were 185 GPU, and 24.3 and 120, respectively. $H_2$, $CO_2$, $N_2$ permeance vs. temperature performance data are presented in FIG. 11A. These data illustrate the observed increase in permeance with temperature rise, consistent with an activated diffusion transport mechanism. FIG. 11B shows $H_2/CO_2$ selectivity as a function of temperature.

Example 10

In this example, a porous PBI fiber of Example 6 was used to fabricate a highly $H_2$-selective membrane. After thermal annealing the fiber at approximately 400° C. for 1 hour in $N_2$ atmosphere, a thin PBI selective layer was deposited using an ultrasonic atomization assisted spray deposition method. A membrane module was assembled using these PBI hollow fibers using PBI dope as the potting material. The module was initially heated up to 250° C. in a pure nitrogen environment. The pure gas $H_2$ permeance, and $H_2/CO_2$ and $H_2/N_2$ selectivity were measured at 250 and 300° C. These data are presented in Table 9.

TABLE 9

| Temperature, ° C. | $H_2$ Permeance, GPU | $H_2/CO_2$ Selectivity | $H_2/N_2$ Selectivity |
|---|---|---|---|
| 250 | 108 | 23.7 | 125 |
| 300 | 157 | 23.4 | 93.3 |

Example 11

Similarly, a PBI hollow fiber module of Example 10 was tested for extended periods of time in a simulated syngas environment at 250° C. The simulated syngas feed stream was prepared by mixing dry syngas (with or without $H_2S$) with a steam stream. The syngas composition consisted of 50% $H_2$, 30% $CO_2$, 19% $H_2O$, 1% CO with and without 20 ppm $H_2S$. FIG. 12 shows $H_2$ permeance and $H_2/CO_2$ selectivity vs. time, illustrates stable long term performance and durability of the PBI hollow fibers.

Example 12

Figure 13A:
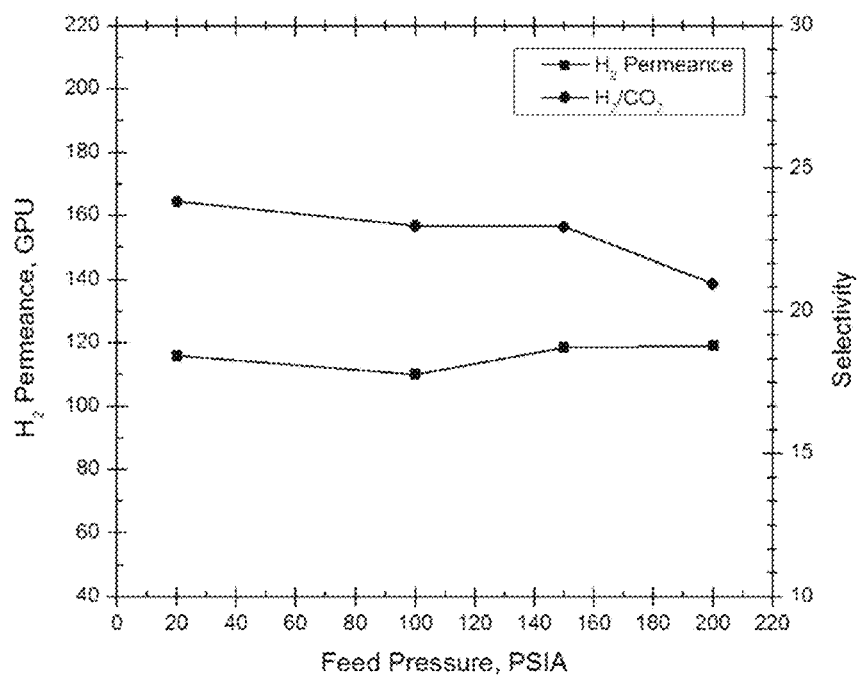
FIGS. 13A and 13B are graphs of $H_2$ permeance; and $H_2/CO_2$ selectivity, respectively, as a function of driving force and temperature measured for an asymmetric PBI hollow fiber membrane in wet syngas containing $H_2S$.
Figure 13B:
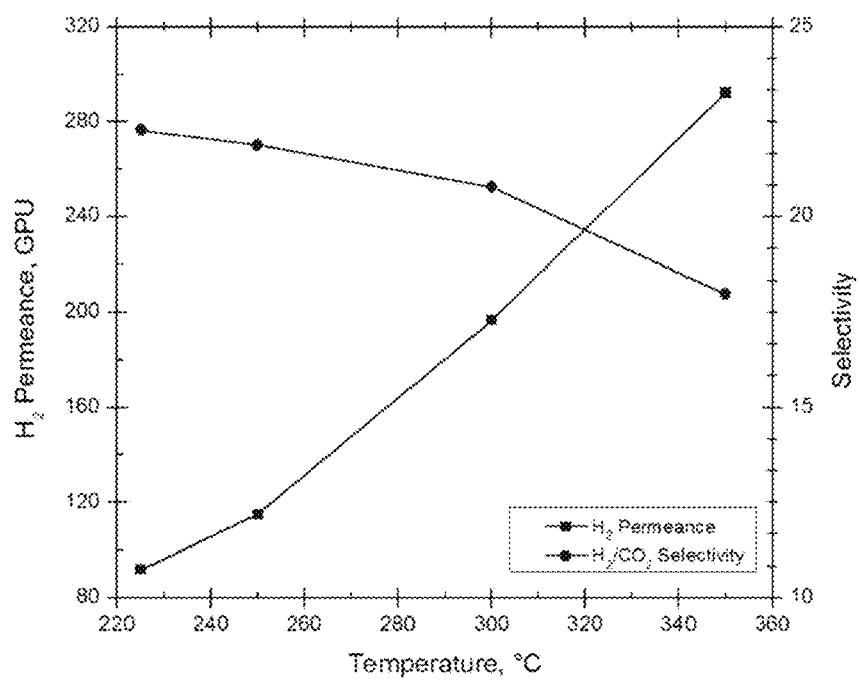

Similarly, a PBI hollow fiber module of Example 10 was tested in a simulated syngas environment as a function of temperature and driving force (FIGS. 13A, 13B). The syngas feed composition used was similar to that reported in Example 11. This example illustrates chemical, thermal and mechanical robustness of the PBI hollow fibers of this invention at elevated temperatures under high pressure differential. This extensive testing demonstrated for the first time, the robustness of a polymeric membrane system to the syngas environment at process-relevant temperatures. Performance data and SEM images from these evaluations illustrate that the membrane exposure to the syngas environment had no effect on the fiber microstructure, interface between selective layer, or integrity of the defect-sealing layer.

Example 13

Figure 14A:
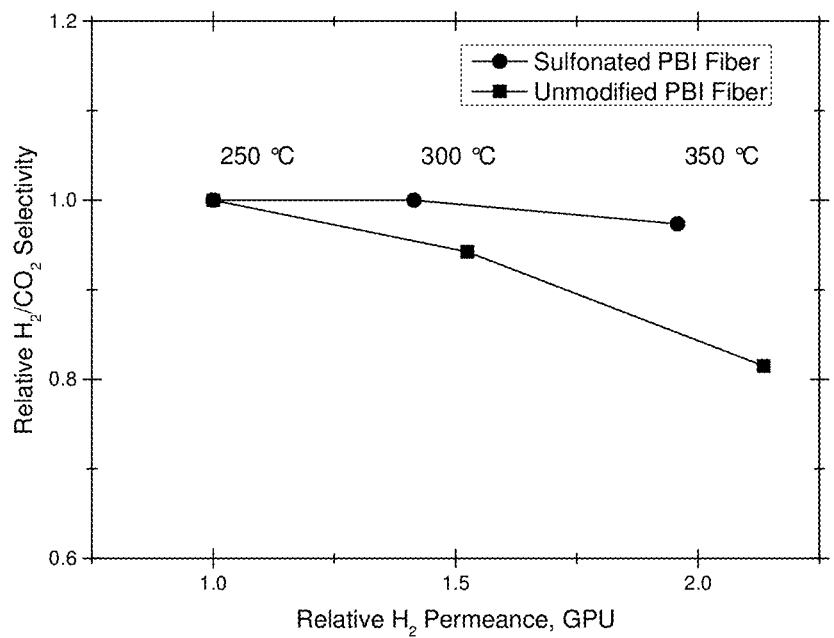
FIG. 14A is a graph of $H_2$ permeance and $H_2/CO_2$ selectivity relative to that measured at 250° C. as a function of temperature for sulfonated and unmodified PBI fibers.
Figure 14B:
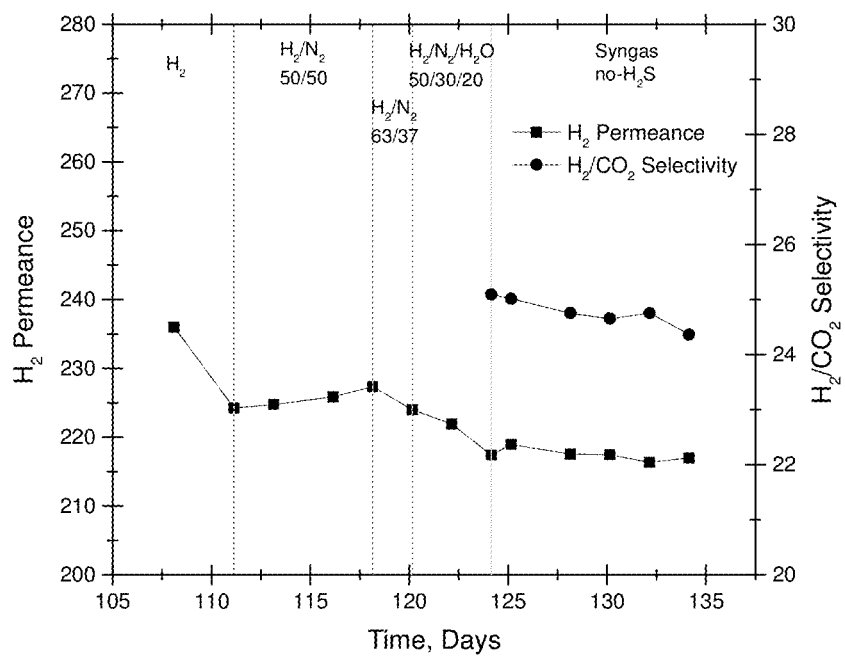
FIG. 14B is a graph illustrating performance of sulfonated PBI fiber in pure, $H_2/N_2$, $H_2/N_2$/Steam and syngas gas feed streams as a function of time.

In this Example, a PBI hollow fiber membrane of Example 1 was sulfonated post fiber spinning and solvent exchange. The PBI hollow fiber was sulfonated in approximately 3 vol % sulfuric acid solution in deionized water for 1 hour at 50° C. After sulfonation the fiber was rinsed with three times with Dl water. The solvent exchange process was repeated to remove water from the sulfonated fiber. The fiber was annealed at 375° C. for 1 hour in nitrogen atmosphere prior to defect-sealing layer deposition and module making for syngas evaluations. The relative $H_2$ permeance and $H_2/CO_2$ selectivity of sulfonated PBI fiber versus non-sulfonated fiber in relative to that at 250° C. are given in FIGS. 14A and 14B. This example illustrates improved selectivity retention in PBI as a function of temperature due to sulfonation. In addition, the $H_2$ permeance measured for sulfonated fiber in pure $H_2$, $H_2/N_2$, $H_2N_2$/Steam and syngas mixed feed streams is also given in FIG. 14.

Example 14

This example illustrates improving the separation performance of PBI hollow fiber using thermal annealing. The PBI hollow fiber was heated to 250° C. at 1° C./min under a $N_2$ environment and dwelled for 24 h after which pure gas permeance was measured at 250° C. The module temperature was raised from 250° C. to 350° C. with 25° C. steps and a 24-hr dwell at each step. Permeance was measured at each step temperature. The module was cooled back to 250° C. and the gas permeance was measured. FIG. 15 summarizes permeation results at various temperatures and shows that $H_2/CO_2$ selectivity was improved without affecting permeance of gases. This example illustrates effects of thermal annealing to further improve separation performance of PBI hollow fibers.

VI. Illustrative Embodiments

Several illustrative embodiments are described in the following numbered paragraphs:

1. A method for making an asymmetric polybenzimidazole hollow fiber membrane, comprising: (a) preparing a polymer dope comprising (i) a polybenzimidazole (PBI) polymer; (ii) a dope stabilizing agent; and (iii) a mixture of a primary solvent A and a secondary solvent/non-solvent B; (b) preparing a bore fluid comprising a solvent/non-solvent C, a solvent/non-solvent D, or a mixture thereof; (c) extruding the polymer dope and the bore fluid through an annulus and an inner tube, respectively, of a tube-in-orifice spinneret to form an extruded hollow fiber; (d) optionally subsequently passing the extruded hollow fiber through an air gap, wherein the air gap comprises an atmosphere with relative humidity in the range of 0-100%; and (e) coagulating the extruded hollow fiber in a coagulation bath comprising a solvent/non-solvent E and/or a solvent/non-solvent F to provide an asymmetric PBI hollow fiber membrane comprising an integral selective layer in intimate contact with a porous support structure.

2. The method for making an asymmetric polybenzimidazole hollow fiber membrane of paragraph 1, wherein: the PBI polymer comprises recurring units of Formula 1, Formula 2, or a combination thereof, wherein Formula 1 is

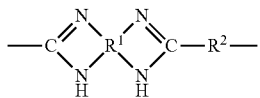

wherein R¹ is a tetravalent aromatic moiety and the nitrogen atoms of Formula I form a benzimidazole moiety with adjacent carbon atoms of R¹, and R² is (1) an aromatic ring, (2) an alkylene group, or (3) a heterocyclic ring from the group consisting of a) pyridine, b) pyrazine, c) furan, d) quinolone, and e) thiophene, and wherein Formula 2 is:

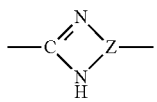

wherein Z is an aromatic moiety and the nitrogen atoms of Formula 2 form a benzimidazole moiety with adjacent carbon atoms of Z.

3. The method for making an asymmetric polybenzimidazole hollow fiber membrane of paragraph 2, wherein R¹ is phenyl, diphenyl, diphenylsulfone, diphenylether, diphenyl hexafluoropropane, naphthalene,

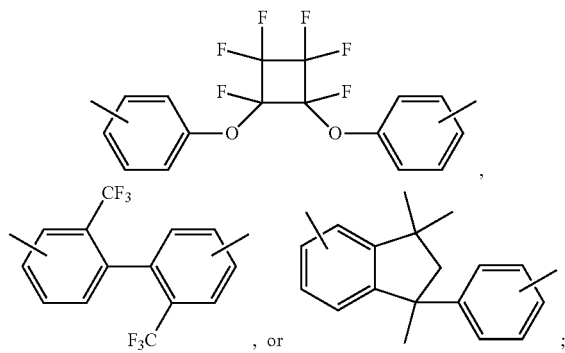

and R², and Z independently are phenyl, diphenyl, diphenylsulfone, diphenylether, diphenyl hexafluoropropane, naphthalene, cyclohexene,

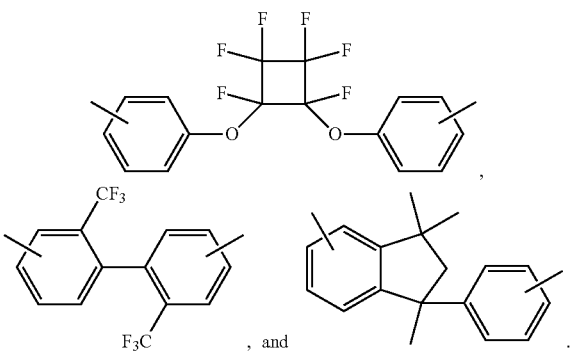

4. The method for making an asymmetric polybenzimidazole hollow fiber membrane of paragraph 1, wherein the PBI polymer has a chemical structure

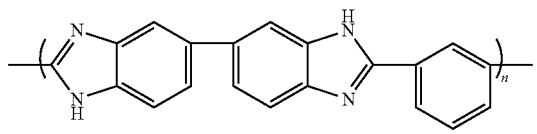

wherein n is any integer >0.

5. The method for making an asymmetric polybenzimidazole hollow fiber membrane of any one of paragraphs 1-4, wherein the polymer dope comprises 10-26 wt. % of the PBI polymer.

6. The method for making an asymmetric polybenzimidazole hollow fiber membrane of any one of paragraphs 1-5, wherein the polymer dope comprises 0.1-10 wt. % of the dope stabilizing agent, and wherein the dope stabilizing agent is an inorganic salt, an ionic liquid, or an organic polymer.

7. The method for making an asymmetric polybenzimidazole hollow fiber membrane of any one of paragraphs 1-6, wherein: the primary solvent A comprises a polar aprotic solvent; the secondary solvent/non-solvent B comprises a ketone, an organic nitrile, an alcohol, or a combination thereof; and the primary solvent A and the secondary solvent/non-solvent B are present in a weight ratio from 1 to 30.

8. The method for making an asymmetric polybenzimidazole hollow fiber membrane of any one of paragraphs 1-7, wherein the secondary solvent/non-solvent B comprises acetonitrile.

9. The method for making an asymmetric polybenzimidazole hollow fiber membrane of any one of paragraphs 1-8, wherein the primary solvent A comprises N,N-dimethylacetamide.

10. The method for making an asymmetric polybenzimidazole hollow fiber membrane of any one of paragraphs 1-9, wherein: the solvent/non-solvent C comprises a ketone, an organic nitrile, an alcohol, or a combination thereof; and the solvent/non-solvent D comprises a polar aprotic solvent, an ionic liquid, or a combination thereof.

11. The method for making an asymmetric polybenzimidazole hollow fiber membrane of any one of paragraphs 1-10, wherein the solvent/non-solvent C comprises acetonitrile.

12. The method for making an asymmetric polybenzimidazole hollow fiber membrane of any one of paragraphs 1-11, wherein the solvent/non-solvent D comprises N,N-dimethylacetamide.

13. The method for making an asymmetric polybenzimidazole hollow fiber membrane of any one of paragraphs 1-12, wherein a volume ratio of the solvent/non-solvent C and the solvent/non-solvent D is in the range of 15/85 to 100/0.

14. The method for making an asymmetric polybenzimidazole hollow fiber membrane of any one of paragraphs 1-13, wherein: the solvent/non-solvent E comprises an alcohol, a ketone, an ester, a C6 alkane, an organic nitrile, water, or any combination thereof; and the solvent/non-solvent F comprises a polar aprotic solvent, an ionic liquid, or any combination thereof.

15. The method for making an asymmetric polybenzimidazole hollow fiber membrane of any one of paragraphs 1-14, wherein the solvent/non-solvent E comprises water.

16. The method for making an asymmetric polybenzimidazole hollow fiber membrane of any one of paragraphs 1-15, wherein the solvent/non-solvent F comprises N,N-dimethylacetamide.

17. The method for making an asymmetric polybenzimidazole hollow fiber membrane of any one of paragraphs 1-16, wherein the bore fluid and the polymer dope have a flow rate ratio in a range of 0.5 to 5.

18. The method for making an asymmetric polybenzimidazole hollow fiber membrane of any one of paragraphs 1-17, wherein the coagulation bath is at a temperature in a range of 4 to 50° C.

19. The method for making an asymmetric polybenzimidazole hollow fiber membrane of any one of paragraphs 1-18, wherein a length of the air gap and a flow rate of the extruded hollow fiber through the spinneret are selected to provide a residence time of the extruded hollow fiber in the air gap of from 0 to 20 seconds.

20. The method for making an asymmetric polybenzimidazole hollow fiber membrane of any one of paragraphs 1-18, further comprising: performing one or more sequential solvent exchanges with one or more solvents/non-solvents E, one or more solvents/non-solvents, F, or any combination thereof; and drying the PBI hollow fiber membrane.

21. The method for making an asymmetric polybenzimidazole hollow fiber membrane of any one of paragraphs 1-20, further comprising depositing a sealing layer on the integral selective layer, the sealing layer comprising a protective PBI polymer having a higher gas permeability than the PBI polymer of the polymer dope.

22. The method for making an asymmetric polybenzimidazole hollow fiber membrane of paragraph 21, further comprising annealing the PBI hollow fiber membrane at a temperature within a range of 300 to 450° C. before depositing the sealing layer.

23. The method for making an asymmetric polybenzimidazole hollow fiber membrane of paragraph 21 or paragraph 22, wherein the protective PBI polymer comprises a plurality of repeating units of Formula 1, Formula 2, or a combination thereof, wherein Formula 1 is

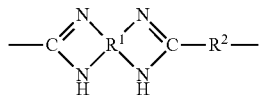

wherein $R^1$ is a tetravalent aromatic moiety and the nitrogen atoms of Formula I form a benzimidazole moiety with adjacent carbon atoms of $R^1$, and $R^2$ is (1) an aromatic ring, (2) an alkylene group, or (3) a heterocyclic ring from the group consisting of a) pyridine, b) pyrazine, c) furan, d) quinolone, e) thiophene, and f) furan, and wherein Formula 2 is:

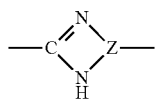

wherein Z is an aromatic moiety and the nitrogen atoms of Formula 2 form a benzimidazole moiety with adjacent carbon atoms of Z.

24. The method for making an asymmetric polybenzimidazole hollow fiber membrane of paragraph 23, wherein the protective PBI polymer comprises a plurality of repeating units of Formula I and at least one of $R^1$ and $R^2$ is

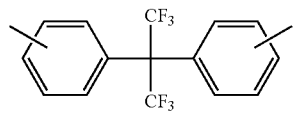

25. The method for making an asymmetric polybenzimidazole hollow fiber membrane of any one of paragraphs 1-24, further comprising: (i) annealing the PBI hollow fiber membrane at a temperature within a range of 250 to 600° C.; (ii) crosslinking the PBI hollow fiber membrane with a crosslinking agent comprising 1,4-$C_6H_4XY$, where X and Y independently are $CH_2Cl$, $CH_2Br$, $CH_2I$, 3,4-dihalo-tetrahydro-thiophene-1,1-dioxide, or a dihaloalkane, wherein each halo atom is chloro, bromo, or iodo; or (iii) a combination of (i) and (ii).

26. The method for making an asymmetric polybenzimidazole hollow fiber membrane of paragraph 25, wherein annealing is performed in an inert or reactive atmosphere.

27. A method for fabricating a membrane module, comprising:
providing a plurality of asymmetric polybenzimidazole hollow fiber membranes made by the method of any one of paragraphs 1-26; and securing the plurality of asymmetric polybenzimidazole hollow fiber membranes in a module with a potting material comprising a polymer dope comprising (i) a polybenzimidazole (PBI) polymer; (ii) a dope stabilizing agent; and (iii) a mixture of a primary solvent A and a secondary solvent/non-solvent B.

28. An asymmetric polybenzimidazole hollow fiber membrane made by the method of any one of paragraphs 1-26.

29. An asymmetric polybenzimidazole (PBI) hollow fiber membrane, comprising: a porous support structure devoid of macrovoids; an integral dense or porous selective layer in intimate contact with the porous support structure and having a thickness within a range of 0.1 µm to 5 µm; and a lumen defined by the porous support structure, wherein the porous support structure and the integral dense or porous selective layer comprise a polybenzimidazole polymer comprising a plurality of repeating units of Formula 1, Formula 2, or a combination thereof, wherein Formula 1 is

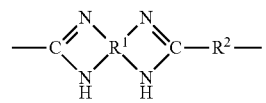

wherein $R^1$ is a tetravalent aromatic moiety and the nitrogen atoms of Formula I form a benzimidazole moiety with adjacent carbon atoms of $R^1$, and $R^2$ is (1) an aromatic ring, (2) an alkylene group, or (3) a heterocyclic ring from the group consisting of a) pyridine, b) pyrazine, c) furan, d) quinolone, and e) thiophene, and wherein Formula 2 is:

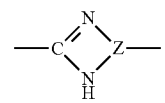

wherein Z is an aromatic moiety and the nitrogen atoms of Formula 2 form a benzimidazole moiety with adjacent carbon atoms of Z.

30. The asymmetric PBI hollow fiber membrane of paragraph 29, wherein the integral selective layer is completely or substantially defect free.

31. The asymmetric PBI hollow fiber membrane of paragraph 29 or paragraph 30, wherein $R^1$ is phenyl, diphenyl, diphenylsulfone, diphenylether, diphenyl hexafluoropropane, naphthalene,

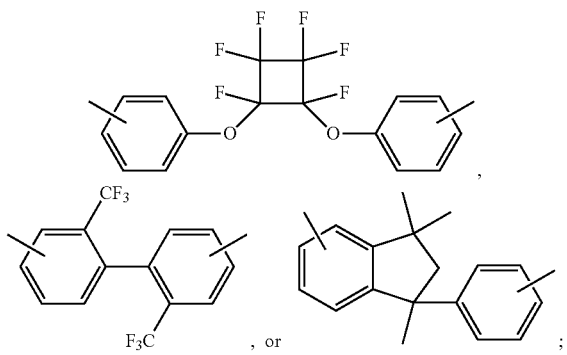, or and $R^2$, and Z independently are phenyl, diphenyl, diphenylsulfone, diphenylether, diphenyl hexafluoropropane, naphthalene, cyclohexene,

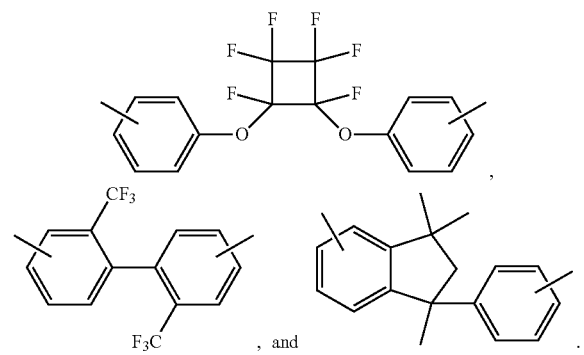, and

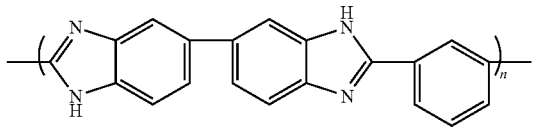.

32. The asymmetric polybenzimidazole hollow fiber membrane of paragraph 29 or paragraph 30, wherein the PBI polymer has a chemical structure

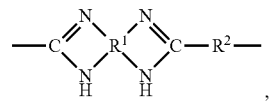

wherein n is any integer >0.

33. The asymmetric PBI hollow fiber membrane of any one of paragraphs 29-32, wherein the asymmetric polybenzimidazole hollow fiber membrane has an outer diameter within a range of 50 μm to 3000 μm.

34. The asymmetric PBI hollow fiber membrane of any one of paragraphs 29-33, wherein the porous support structure has an interconnected open cellular structure and a thickness within a range of 10 to 1500 μm.

35. The asymmetric PBI hollow fiber membrane of paragraph 29-34, wherein the integral porous selective layer has pores with an average diameter less than or equal to an average diameter of pores of the porous support structure.

36. The asymmetric PBI hollow fiber membrane of any one of paragraphs 29-35, further comprising a selective layer deposited on the integral porous selective layer, the selective layer comprising an organic material, an inorganic material, an ionic liquid, a metal, or any combination thereof.

37. The asymmetric PBI hollow fiber membrane of any one of paragraphs 29-36, further comprising a selective layer deposited using dip coating, spray coating, ultra-sonic atomization assisted spray deposition, atomic layer deposition, chemical vapor deposition, and any combination thereof.

38. The asymmetric PBI hollow fiber membrane of any one of paragraphs 29-37, further comprising a sealing layer deposited on the integral dense or porous selective layer, the sealing layer comprising a PBI polymer having a higher gas permeability than the PBI polymer of the integral dense or porous selective layer and the porous support structure.

39. The asymmetric PBI hollow fiber membrane of paragraph 38, wherein the PBI polymer of the sealing layer comprises a plurality of repeating units of Formula 1, Formula 2, or a combination thereof, wherein Formula 1 is

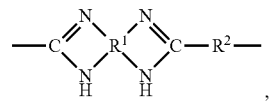

and
wherein at least one of $R^1$ and $R^2$ is

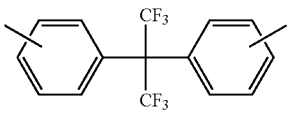.

40. The asymmetric PBI hollow fiber membrane of paragraph 38 or paragraph 39, wherein the sealing layer has a thickness within a range of 0.1 μm to 5 μm.

41. The asymmetric PBI hollow fiber membrane of any one of paragraphs 29-40, wherein the asymmetric PBI hollow fiber membrane has (i) a hydrogen/carbon dioxide permselectivity within a range of 5 to 50, (ii) a hydrogen/nitrogen permselectivity within a range of 20 to 700, or (iii) both a hydrogen/carbon dioxide permselectivity within a range of 5 to 50 and a hydrogen/nitrogen permselectivity within a range of 20 to 700.

42. The asymmetric PBI hollow fiber membrane of any one of paragraphs 29-41, wherein the asymmetric PBI hollow fiber membrane exhibits hydrogen permeance greater than 100 GPU, wherein 1 GPU is $3.3 \times 10^{-1}$ mol/(m$^2$-s-Pa).

43. A polybenzimidazole hollow fiber membrane module, comprising: a module shell; a plurality of asymmetric polybenzimidazole hollow fiber membranes according to any one of paragraphs 29-42 within the module shell; and a potting material comprising (i) a polybenzimidazole (PBI) polymer; (ii) a dope stabilizing agent; and (iii) a mixture of a primary solvent A and a secondary solvent/non-solvent B.

44. A method for separating gases from a gas stream comprising: contacting a first side of an asymmetric PBI hollow fiber membrane according to any one of paragraphs 29-43 with a gas stream comprises two or more gases or vapors; drawing a vacuum on a second side of the asymmetric PBI hollow fiber membrane or sweeping the second side of the asymmetric hollow fiber membrane with an inert gas or steam; and collecting a permeate stream and a retentate stream.

45. The method for separating gases from a gas stream of paragraph 44, wherein the first side comprises the integral selective layer of the asymmetric PBI hollow fiber membrane and the second side comprises the porous support structure of the asymmetric PBI hollow fiber membrane.

46. The method for separating gases from a gas stream of paragraph 44 or paragraph 45, wherein the integral selective layer is contacted with the gas at a pressure within a range of 20 to 1000 psi.

47. The method for separating gases from a gas stream of any one of paragraphs 44-46, wherein the integral selective layer is contacted with the gas at a temperature within a range of 100 to 400° C.

48. The method of separating gases from a gas stream of any one of paragraphs 44-47, wherein the gas stream is synthesis gas (syngas).

49. The method of separating gases from a gas stream of any one of paragraphs 44-48, wherein hydrogen is preferentially transported across the asymmetric PBI hollow fiber membrane while carbon dioxide is preferentially retained on the first side of the asymmetric PBI hollow fiber membrane.

50. The method of separating gases from a gas stream of any one of paragraphs 44-49, wherein the PBI hollow fiber membrane has a hydrogen/carbon dioxide permselectivity within a range of 5 to 50, and a hydrogen/nitrogen permselectivity within a range of 20 to 700.

51. The method for separating gases from a gas stream of any one of paragraphs 44-50, wherein the gas stream comprises hydrogen, carbon monoxide, carbon dioxide, steam, hydrocarbons, nitrogen, hydrogen sulfide, carbonyl sulfide, ammonia, oxygen, or any combination thereof.

52. The method for separating gases from a gas stream of any one of paragraphs 44-51, wherein the gas stream comprises steam, the method further comprising condensing gaseous water from the permeate stream, the retentate stream, or the permeate stream and the retentate stream.

53. A method for separating water and an organic liquid, comprising: contacting a first side of an asymmetric PBI hollow fiber membrane according to any one of paragraphs 29-43 with a mixture comprising an organic liquid and water; drawing a vacuum on a second side of the asymmetric PBI hollow fiber membrane or contacting the second side with another fluid (gas, liquid, or vapor); and collecting a permeate from the second side of the asymmetric PBI hollow fiber membrane and collecting a retentate from the first side of the asymmetric PBI hollow fiber membrane.

54. A method for separating impurities and/or dissolved material from water, comprising: contacting a first side of an asymmetric PBI hollow fiber membrane according to any one of paragraphs 29-43 with a solution comprising water and impurities; drawing a vacuum on a second side of the asymmetric PBI hollow fiber membrane or contacting the second side with another fluid (gas, liquid, or vapor); and collecting a permeate from the second side of the asymmetric PBI hollow fiber membrane and collecting a retentate comprising the impurities and/or dissolved material from the first side of the asymmetric PBI hollow fiber membrane.

In view of the many possible embodiments to which the principles of the disclosed invention may be applied, it should be recognized that the illustrated embodiments are only preferred examples and should not be taken as limiting the scope of the disclosure. Rather, the scope of the disclosure is defined by the following claims. We therefore claim as our invention all that comes within the scope and spirit of these claims.

We claim:

1. A method for making an asymmetric polybenzimidazole hollow fiber membrane, comprising:
    (a) preparing a polymer dope comprising (i) a polybenzimidazole (PBI) polymer; (ii) a dope stabilizing agent; and (iii) a mixture of a primary solvent A and acetonitrile;
    (b) preparing a bore fluid comprising a solvent/non-solvent C, a solvent/non-solvent D, or a mixture thereof;
    (c) extruding the polymer dope and the bore fluid through an annulus and an inner tube, respectively, of a tube-in-orifice spinneret to form an extruded hollow fiber;
    (d) optionally subsequently passing the extruded hollow fiber through an air gap, wherein the air gap comprises an atmosphere with relative humidity in the range of 0-100%; and
    (e) coagulating the extruded hollow fiber in a coagulation bath comprising a solvent/non-solvent E and/or a solvent/non-solvent F to provide an asymmetric PBI hollow fiber membrane comprising an integral selective layer in intimate contact with a porous support structure.

2. The method for making an asymmetric polybenzimidazole hollow fiber membrane of claim 1, wherein:
    the PBI polymer comprises recurring units of Formula 1, Formula 2, or a combination thereof, wherein Formula 1 is

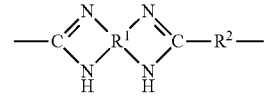

wherein $R^1$ is a tetravalent aromatic moiety and the nitrogen atoms of Formula I form a benzimidazole moiety with adjacent carbon atoms of $R^1$, and $R^2$ is (1) an aromatic ring, (2) an alkylene group, or (3) a heterocyclic ring from the group consisting of a) pyridine, b) pyrazine, c) furan, d) quinolone, and e) thiophene, and
    wherein Formula 2 is:

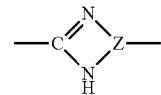

wherein Z is an aromatic moiety and the nitrogen atoms of Formula 2 form a benzimidazole moiety with adjacent carbon atoms of Z.

3. The method for making an asymmetric polybenzimidazole hollow fiber membrane of claim 2, wherein:
    $R^1$ is phenyl, diphenyl, diphenylsulfone, diphenylether, diphenyl hexafluoropropane, naphthalene,

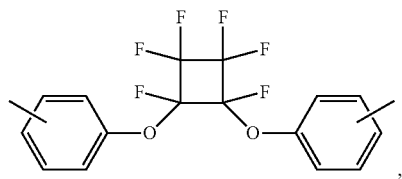

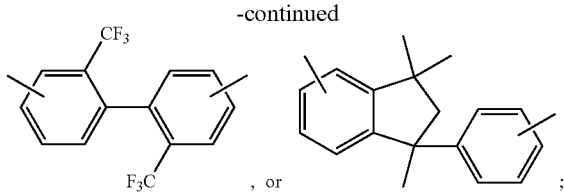
, or and

R² and Z independently are phenyl, diphenyl, diphenylsulfone, diphenylether, diphenyl hexafluoropropane, naphthalene, cyclohexene,

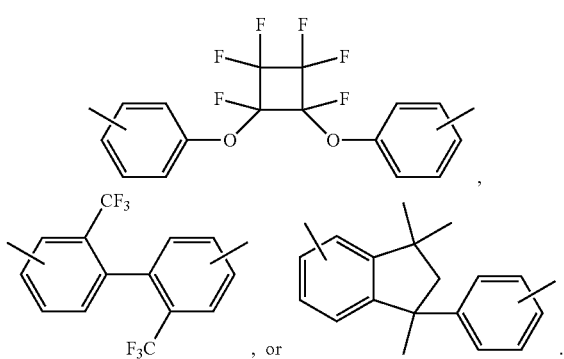
,

, or
.

4. The method for making an asymmetric polybenzimidazole hollow fiber membrane of claim 1, wherein the PBI polymer has a chemical structure

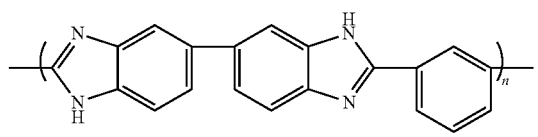

wherein n is any integer >0.

5. The method for making an asymmetric polybenzimidazole hollow fiber membrane of claim 1, wherein the polymer dope comprises:
(i) 10-26wt. % of the PBI polymer;
(ii) 0.1-10wt. % of the dope stabilizing agent, wherein the dope stabilizing agent is an inorganic salt, an ionic liquid, or an organic polymer; or
(iii) both (i) and (ii).

6. The method for making an asymmetric polybenzimidazole hollow fiber membrane of claim 1, wherein:
(i) the primary solvent A comprises a polar aprotic solvent;
(ii) the solvent/non-solvent C comprises a ketone, an organic nitrile, an alcohol, or a combination thereof, and the solvent/non-solvent D comprises a polar aprotic solvent, an ionic liquid, or a combination thereof;
(iii) the solvent/non-solvent E comprises an alcohol, a ketone, an ester, a C6 alkane, an organic nitrile, water, or any combination thereof, and the solvent/non-solvent F comprises a polar aprotic solvent, an ionic liquid, or any combination thereof; or
(iv) any combination of (i), (ii), and (iii).

7. The method for making an asymmetric polybenzimidazole hollow fiber membrane of claim 1, wherein the bore fluid and the polymer dope have a flow rate ratio in a range of 0.5 to 5.

8. The method for making an asymmetric polybenzimidazole hollow fiber membrane of claim 1, wherein a length of the air gap and a flow rate of the extruded hollow fiber through the spinneret are selected to provide a residence time of the extruded hollow fiber in the air gap of from greater than 0 seconds to 20 seconds.

9. The method for making an asymmetric polybenzimidazole hollow fiber membrane of claim 1, further comprising:
performing one or more sequential solvent exchanges with one or more solvents/non-solvents E, one or more solvents/non-solvents, F, or any combination thereof; and
drying the PBI hollow fiber membrane.

10. A method for making an asymmetric polybenzimidazole hollow fiber membrane, comprising:
(a) preparing a polymer dope comprising (i) a polybenzimidazole (PBI) polymer; (ii) a dope stabilizing agent; and (iii) a mixture of a primary solvent A and a secondary solvent/non-solvent B;
(b) preparing a bore fluid comprising a solvent/non-solvent C, a solvent/non-solvent D, or a mixture thereof;
(c) extruding the polymer dope and the bore fluid through an annulus and an inner tube, respectively, of a tube-in-orifice spinneret to form an extruded hollow fiber;
(d) optionally subsequently passing the extruded hollow fiber through an air gap, wherein the air gap comprises an atmosphere with relative humidity in the range of 0-100%;
(e) coagulating the extruded hollow fiber in a coagulation bath comprising a solvent/non-solvent E and/or a solvent/non-solvent F to provide an asymmetric PBI hollow fiber membrane comprising an integral selective layer in intimate contact with a porous support structure; and
(f) depositing a sealing layer on the integral selective layer, the sealing layer comprising a protective PBI polymer having a higher gas permeability than the PBI polymer of the polymer dope.

11. The method for making an asymmetric polybenzimidazole hollow fiber membrane of claim 10, further comprising annealing the PBI hollow fiber membrane at a temperature within a range of 300 to 450° C. before depositing the sealing layer.

12. The method for making an asymmetric polybenzimidazole hollow fiber membrane of claim 10, wherein the protective PBI polymer comprises a plurality of repeating units of Formula 1, Formula 2, or a combination thereof, wherein Formula 1 is

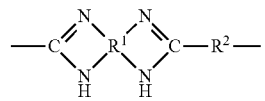

wherein R¹ is a tetravalent aromatic moiety and the nitrogen atoms of Formula I form a benzimidazole moiety with adjacent carbon atoms of R¹, and R² is (1) an aromatic ring, (2) an alkylene group, or (3) a heterocyclic ring from the group consisting of a) pyridine, b) pyrazine, c) furan, d) quinolone, and e) thiophene, and wherein Formula 2 is:

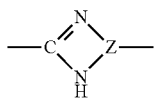

wherein Z is an aromatic moiety and the nitrogen atoms of Formula 2 form a benzimidazole moiety with adjacent carbon atoms of Z.

13. The method for making an asymmetric polybenzimidazole hollow fiber membrane of claim 12, wherein the protective PBI polymer comprises a plurality of repeating units of Formula I and at least one of $R^1$ and $R^2$ is

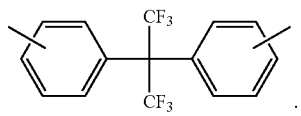

14. The method for making an asymmetric polybenzimidazole hollow fiber membrane of claim 1, further comprising:
   (i) annealing the PBI hollow fiber membrane at a temperature within a range of 250 to 600° C.;
   (ii) crosslinking the PBI hollow fiber membrane with a crosslinking agent comprising 1,4-$C_6H_4$XY, where X and Y independently are $CH_2Cl$, $CH_2Br$, $CH_2I$, 3,4-dihalo-tetrahydro-thiophene-1,1-dioxide, or a dihaloalkane, wherein each halo atom is chloro, bromo, or iodo; or
   (iii) a combination of (i) and (ii).

15. A method for fabricating a membrane module, comprising:
   providing a plurality of asymmetric polybenzimidazole hollow fiber membranes made by
      (a) preparing a polymer dope comprising (i) a polybenzimidazole (PBI) polymer; (ii) a dope stabilizing agent; and (iii) a mixture of a primary solvent A and a secondary solvent/non-solvent B,
      (b) preparing a bore fluid comprising a solvent/non-solvent C, a solvent/non-solvent D, or a mixture thereof,
      (c) extruding the polymer dope and the bore fluid through an annulus and an inner tube, respectively, of a tube-in-orifice spinneret to form an extruded hollow fiber,
      (d) optionally subsequently passing the extruded hollow fiber through an air gap, wherein the air gap comprises an atmosphere with relative humidity in the range of 0-100%, and
      (e) coagulating the extruded hollow fiber in a coagulation bath comprising a solvent/non-solvent E and/or a solvent/non-solvent F to provide an asymmetric PBI hollow fiber membrane comprising an integral selective layer in intimate contact with a porous support structure; and
   securing the plurality of asymmetric polybenzimidazole hollow fiber membranes in a module with a potting material comprising a polymer dope comprising (i) a polybenzimidazole (PBI) polymer; (ii) a dope stabilizing agent; and (iii) a mixture of a primary solvent A and a secondary solvent/non-solvent B.

16. An asymmetric polybenzimidazole (PBI) hollow fiber membrane, comprising:
   a porous support structure devoid of macrovoids;
   an integral porous selective layer in intimate contact with the porous support structure and having a thickness within a range of 0.1 µm to 5 µm; and
   a lumen defined by the porous support structure, wherein the porous support structure and the integral porous selective layer comprise a polybenzimidazole polymer comprising a plurality of repeating units of Formula 1, Formula 2, or a combination thereof, wherein Formula 1 is

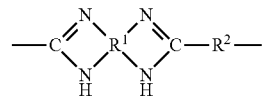

wherein $R^1$ is a tetravalent aromatic moiety and the nitrogen atoms of Formula 1 form a benzimidazole moiety with adjacent carbon atoms of $R^1$, and $R^2$ is (1) an aromatic ring, (2) an alkylene group, or (3) a heterocyclic ring from the group consisting of a) pyridine, b) pyrazine, c) furan, d) quinolone, and e) thiophene, and
   wherein Formula 2 is:

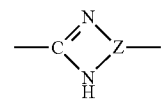

wherein Z is an aromatic moiety and the nitrogen atoms of Formula 2 form a benzimidazole moiety with adjacent carbon atoms of Z.

17. The asymmetric polybenzimidazole hollow fiber membrane of claim 16, wherein the PBI polymer has a chemical structure

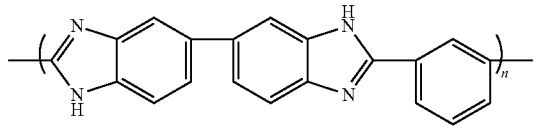

wherein n is any integer >0.

18. The asymmetric PBI hollow fiber membrane of claim 16, wherein:
   (i) the asymmetric polybenzimidazole hollow fiber membrane has an outer diameter within a range of 50 µm to 3000 82 m;
   (ii) the porous support structure has an interconnected open cellular structure and a thickness within a range of 10 to 1500 82 m;
   (iii) the integral porous selective layer has pores with an average diameter less than or equal to an average diameter of pores of the porous support structure; or
   (iv) any combination of (i), (ii), and (iii).

19. An asymmetric PBI hollow fiber membrane comprising:
   a porous support structure devoid of macrovoids;
   an integral dense or porous selective layer in intimate contact with the porous support structure and having a thickness within a range of 0.1 µm to 5 µm; and a lumen defined by the porous support structure, wherein the porous support structure and the integral dense or porous selective layer comprise a polybenzimidazole polymer comprising a plurality of repeating units of Formula 1, Formula 2, or a combination thereof, wherein Formula 1 is

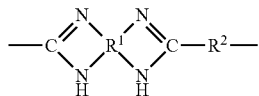

wherein R¹ is a tetravalent aromatic moiety and the nitrogen atoms of Formula 1 form a benzimidazole moiety with adjacent carbon atoms of R¹, and R² is (1) an aromatic ring, (2) an alkylene group, or (3) a heterocyclic ring from the group consisting of a) pyridine, b) pyrazine, c) furan, d) quinolone, and e) thiophene, and
wherein Formula 2 is:

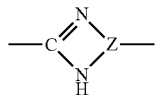

wherein Z is an aromatic moiety and the nitrogen atoms of Formula 2 form a benzimidazole moiety with adjacent carbon atoms of Z; and
(i) a selective layer deposited on the integral porous selective layer, the deposited selective layer comprising an organic material, an inorganic material, an ionic liquid, a metal, or any combination thereof, or (ii) a sealing layer deposited on the integral dense or porous selective layer, the sealing layer comprising a PBI polymer having a higher gas permeability than the PBI polymer of the integral dense or porous selective layer and the porous support structure.

20. The asymmetric PBI hollow fiber membrane of claim 19, wherein the asymmetric PBI hollow fiber membrane comprises a sealing layer, and the PBI polymer of the sealing layer comprises a plurality of repeating units of Formula 1, Formula 2, or a combination thereof, wherein Formula 1 is

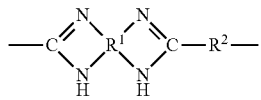

and wherein at least one of R¹ and R² is

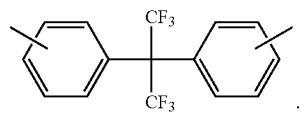

21. The asymmetric PBI hollow fiber membrane of claim 19, wherein the asymmetric PBI hollow fiber membrane has:
(i) a hydrogen/carbon dioxide permselectivity within a range of 5 to 50;
(ii) a hydrogen/nitrogen permselectivity within a range of 20 to 700;
(iii) a hydrogen permeance greater than 100 GPU, wherein 1 GPU is $3.3 \times 10^{-1}$ mol/(m²-s-Pa); or
(iv) any combination of (i), (ii), and (iii).

22. A polybenzimidazole hollow fiber membrane module, comprising:
a module shell;
a plurality of asymmetric polybenzimidazole hollow fiber membranes within the module shell, each asymmetric polybenzimidazole hollow fiber membrane comprising
a porous support structure devoid of macrovoids,
an integral dense or porous selective layer in intimate contact with the porous support structure and having a thickness within a range of 0.1 μm to 5 μm, and
a lumen defined by the porous support structure, wherein
the porous support structure and the integral dense or porous selective layer comprise a polybenzimidazole polymer comprising a plurality of repeating units of Formula 1, Formula 2, or a combination thereof, wherein Formula 1 is

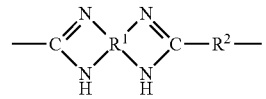

wherein R¹ is a tetravalent aromatic moiety and the nitrogen atoms of Formula 1 form a benzimidazole moiety with adjacent carbon atoms of R¹, and R² is (1) an aromatic ring, (2) an alkylene group, or (3) a heterocyclic ring from the group consisting of a) pyridine, b) pyrazine, c) furan, d) quinolone, and e) thiophene, and
wherein Formula 2 is:

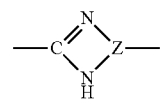

wherein Z is an aromatic moiety and the nitrogen atoms of Formula 2 form a benzimidazole moiety with adjacent carbon atoms of Z; and
a potting material comprising (i) a polybenzimidazole (PBI) polymer; (ii) a dope stabilizing agent; and (iii) a mixture of a primary solvent A and a secondary solvent/non-solvent B.

23. A method for separating gases from a gas stream comprising:
contacting a first side of an asymmetric PBI hollow fiber membrane according to claim 19 with a gas stream comprising two or more gases or vapors;
drawing a vacuum on a second side of the asymmetric PBI hollow fiber membrane or sweeping the second side of the asymmetric hollow fiber membrane with a fluid comprising an inert gas or steam; and
collecting a permeate stream and a retentate stream.

24. The method for separating gases from a gas stream of claim 23, wherein the first side comprises the integral selective layer of the asymmetric PBI hollow fiber membrane and the second side comprises the porous support structure of the asymmetric PBI hollow fiber membrane.

25. The method for separating gases from a gas stream of claim 23, wherein:

(i) the integral selective layer is contacted with the gas at a pressure within a range of 20 to 1000 psi;
(ii) the integral selective layer is contacted with the gas at a temperature within a range of 100 to 400° C.; or
(iii) both (i) and (ii).

26. The method of separating gases from a gas stream of claim 23, wherein:
(i) hydrogen is preferentially transported across the asymmetric PBI hollow fiber membrane while carbon dioxide is preferentially retained on the first side of the asymmetric PBI hollow fiber membrane;
(ii) the PBI hollow fiber membrane has a hydrogen/carbon dioxide permselectivity within a range of 5 to 50, and a hydrogen/nitrogen permselectivity within a range of 20 to 700; or
(iii) both (i) and (ii).

27. A method for separating water and an organic liquid, comprising:
contacting a first side of an asymmetric PBI hollow fiber membrane according to claim 19 with a mixture comprising an organic liquid and water;
drawing a vacuum on a second side of the asymmetric PBI hollow fiber membrane or contacting the second side with another fluid; and
collecting a permeate from the second side of the asymmetric PBI hollow fiber membrane and collecting a retentate from the first side of the asymmetric PBI hollow fiber membrane.

28. A method for separating impurities and/or dissolved material from water, comprising:
contacting a first side of an asymmetric PBI hollow fiber membrane according to claim 16 with a solution comprising water and impurities;
drawing a vacuum on a second side of the asymmetric PBI hollow fiber membrane or contacting the second side with another fluid; and
collecting a permeate from the second side of the asymmetric PBI hollow fiber membrane and collecting a retentate comprising the impurities and/or dissolved material from the first side of the asymmetric PBI hollow fiber membrane.

29. The method for making an asymmetric polybenzimidazole hollow fiber membrane of claim 10, wherein the PBI polymer has a chemical structure

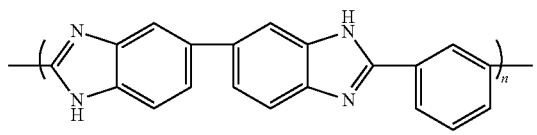

wherein n is any integer >0.

30. The asymmetric polybenzimidazole hollow fiber membrane of claim 19, wherein the PBI polymer has a chemical structure

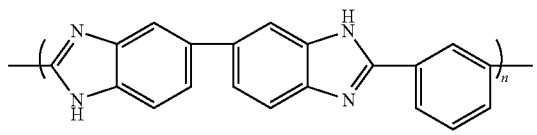

wherein n is any integer >0.

* * * * *